United States Patent
Poehler et al.

(10) Patent No.: US 6,699,621 B2
(45) Date of Patent: *Mar. 2, 2004

(54) METHOD FOR ELECTROCHEMICAL CONDITIONING POLYMERIC ELECTRODES

(75) Inventors: Theodore O. Poehler, Baltimore, MD (US); Peter Searson, Stevenson, MD (US); Jeffrey G. Killian, Baltimore, MD (US); Haripada Sarker, Baltimore, MD (US); Jennifer Giaccai, Baltimore, MD (US); Yosef Gofer, Hod Hashron (IL); Walkiria S. Schlindwein, Leicester (GB)

(73) Assignee: Johns Hopkins University, Baltimore, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 139 days.

(21) Appl. No.: 09/227,214

(22) Filed: Jan. 8, 1999

(65) Prior Publication Data

US 2003/0143461 A1 Jul. 31, 2003

Related U.S. Application Data

(63) Continuation-in-part of application No. 08/961,100, filed on Oct. 30, 1997, now Pat. No. 6,120,940, which is a continuation-in-part of application No. 08/741,015, filed on Oct. 30, 1996, now Pat. No. 5,733,683.

(51) Int. Cl.[7] .......................... H01M 6/14; H01M 4/60; H01M 6/16; H01M 6/00
(52) U.S. Cl. ....................... 429/303; 429/213; 429/338; 429/340; 29/623.1
(58) Field of Search ................................. 429/303, 213, 429/212, 338, 340; 252/500; 29/623.1

(56) References Cited

U.S. PATENT DOCUMENTS

| 4,837,096 A | * | 6/1989 | Kimura et al. ............... 429/213 |
| 5,286,414 A | * | 2/1994 | Kampf et al. ............... 252/500 |
| H1462 H | * | 7/1995 | Walker, Jr. .................. 429/191 |
| 5,637,421 A | * | 6/1997 | Poehler et al. .............. 429/303 |
| 5,733,683 A | * | 3/1998 | Searson et al. ............. 429/213 |
| 5,900,336 A | * | 5/1999 | Kabata et al. ........... 429/231.4 |

FOREIGN PATENT DOCUMENTS

WO  99 23711  5/1999

OTHER PUBLICATIONS

Sarker et al., "Synthesis and characterization of a series of fluorine–substituted phenylene–thienyl polymers for batteries applications", Synthetic Metals, vol. 97, No. 1, Jan. 1, 1998.

Taliani et al., "Optical and electrical properties of a new conductive polyheterocycle: . . . ", STN Chemical Abstracts vol. 22, No. 108, May 30, 1988, XP002093705.

* cited by examiner

Primary Examiner—Patrick Ryan
Assistant Examiner—Julian Mercado
(74) Attorney, Agent, or Firm—Venable LLP; Ann S. Hobbs

(57) ABSTRACT

A method of manufacture of an electrode formed from at least one electrically conductive polymer having a lower, polymerization potential than p-doping peak. The method of manufacture of the electrode including a conditioning step which results in remarkably high charge capacities and excellent cycling efficiency. The provision of these polymeric electrodes further permits the manufacture of an electrochemical storage cell which is substantially free of metal components, thereby improving handling of the storage cell and obviating safety and environmental concerns associated with alternative secondary battery technology.

24 Claims, 12 Drawing Sheets

(a) n-doped    (b) p-doped

*p-Doped Neutralization Charge (mC)

*p-Doped Neutralization Charge (mC)

*p-Doped Neutralization Charge (mC)

METHOD FOR ELECTROCHEMICAL CONDITIONING POLYMERIC ELECTRODES

This application is a Continuation-in-Part of U.S. application Ser. No. 08/961,100, filed Oct. 30, 1997, now U.S. Pat. No. 6,120,940, which is a Continuation-in-Part of U.S. application Ser. No. 08/741,015, filed Oct. 30, 1996, now U.S. Pat. No. 5,733,683.

The work that resulted in the subject invention was supported by Grant No. FA8002-96-C-03031 with the United States Department of the Air Force as the sponsoring government agency.

BACKGROUND OF THE INVENTION

1. Field of the Invention

The present invention relates to a method of fabricating and/or conditioning electrically conductive and electrochemically oxidizable and/or reducible polymeric electrodes for use in a battery or electrochemical storage cell, in particular a secondary cell. A battery or electrochemical storage cell utilizing an electrode conditioned by the method of the present invention can be at least substantially free, or completely free, of metal components.

2. Description of the Related Art

Since the discovery that polymeric materials, and in particular polyacetylene, could be reversibly doped and undoped and thus employed as electrode materials for charge storage applications, much consideration and investigation have been directed towards employing polymers in a wide variety of electrical and electronic device applications, including energy storage [R. B. Kaner et al., J. Phys. Chem., 90, 5102 (1989); K. Kaneto et al. Japn. J. Appl. Phys., 22, L567 (1983)], light emitting diodes [D. Braun et al., Appl. Phys. Lett., 58, 1982 (1991); J. J. M. Halls et al. Nature, 376, 498 (1995); M. Granstrom et al., Science, 267, 1479 (1995)], sensors [J. W. Thackeray et al., J. Phys. Chem., 89, 5133 (1985); G. Fortier et al., Biosensors and Bioelectronics, 5, 473 (1990); P. N. Bartlett et al., J. Electroanal. Chem., 224, 27 (1987)], and electrochromic devices [H. Yashima et al., J. Electrochem. Soc., 134, 46 (1987); M. Gazard, Handbook of Conducting Polymers, Vol. 1, ed. (1983)].

The conductivity of neutral polymers can be dramatically increased by chemically doping the polymers in a controlled manner with electron acceptor and/or electron donor dopants. The term doping used in connection with conducting polymers refers to the partial oxidation (p-doping) or partial reduction (n-doping) of the polymer, combined with the associated transport of charge compensating dopant ions into or out of the polymer. Conducting polymers are characterized by their ability to be switched between a neutral (or insulating) state and one or more doped (conducting) state(s).

In charge storage applications, such as electrochemical secondary storage cells, electrode materials should be able to undergo multiple doping and undoping cycles with high utilization efficiency and chemical stability. In addition, the two electrode materials should have a high charge capacity and combine to exhibit a high cell voltage.

Polyacetylene, polypyrrole, polyaniline, polythienylene, and polythiophene are among the several polymers that have been investigated and drawn intense interest to date in connection with charge storage applications. For example, a polymeric storage cell with a polypyrrole (cathode) electrode and polypyrrole/polystyrene sulfonate (anode) electrode is described in U.S. Pat. No. 5,637,421 to Poehler et al., the complete disclosure of which is hereby incorporated by reference.

However, repeated doping and undoping during charging and/or discharge may cause degradation of the polymer. Many polymers, such as polyacetylene, have been plagued by poor charge/discharge cycling characteristics (i.e., reversibility) due to inferior chemical and electrochemical stability. Limited improvement in charge capacity and reversibility has been reported in connection with the p-doping of poly (3(4-fluorophenyl) thiophene), this polythiophene derivative exhibits improved charge capacity reversibility when n-doped. Further improvement was shown by varying the position and number of electrophilic substituents on a phenyl thiophene. See U.S. Pat. No. 5,733,683, Searson et al., Y. Gofer, J. G. Killian, H. Sarker, J. O. Poehler, P. L. Searson, J. Electrochem. Soc. 443, 103–115. (1998) the complete disclosures of which are fully incorporated herein by reference.

Thus, while some progress has been made in understanding conduction mechanisms, electronic structure, doping characteristics, and optical properties in conductive polymers, there remains the need to develop a method of fabricating improved polymeric electrodes for electrochemical storage cells that exhibit suitable charge capacities and reversibilities in both the n-doped and p-doped states and can be employed in commercial applications without the need for metallic components.

SUMMARY OF THE INVENTION

It is therefore an object of the present invention to provide a method of conditioning polymeric electrode materials so as to improve their charge capacities and enhance their abilities to undergo multiple doping and undoping cycles with high cycling efficiency and chemical stability.

In accordance with the principles of the present invention, this and other objects are achieved by a method of electrochemical conditioning of an electrode prepared from a polymer having a lower polymerization potential than p-doping peak. Especially suited for this invention are (1) a series of fluorophenyl thiophene polymers synthesized by devising preparatory techniques to systematically vary the number and position of the fluorine on the phenyl group; and (2) a series of different phenylene-thienyl based polymers synthesized by devising preparatory techniques to systematically vary the number and position of the fluorine on the phenyl group. These polymers are disclosed in related co-pending U.S. Patent Application No. 08/961,100 filed Oct. 30, 1997, which is fully incorporated herein by reference.

The electrochemically conditioned electrode, prepared according to the method of the present invention, exhibits an improved high electrochemical stability and charge capacity for both n-doping and p-doping, particularly in a sulfolane-based electrolyte.

A substantially metal-free cell can be constructed which employs electrodes conditioned by the method of the present invention. Such a cell could be manufactured by providing non-metallic current collectors carbon black loaded polyethylene, and supports, such as graphite current collectors and poly(tetrafluoroethylene) (TEFLON) supports.

Since cells employing electrodes manufactured by the method of the present invention can be fabricated from multiple polymer films, the cells are lightweight and flexible and do not have the safety and environmental concerns associated with conventional high performance batteries.

The elimination of any metallic components or liquid phases provides a unique alternative for battery technology.

Further, since the components of such a cell are both moldable into various shapes and flexible, the cell can be incorporated into a device, such as a lining, and therefore takes up much less space in the device. This feature makes an electrochemical cell.fabricated by the method of the present invention especially adaptable for application in battery-operated automobiles and satellites, and other compact devices.

The present invention still further relates to batteries and electrolyte storage cells containing electrodes electrochemically conditioned according to the method of the present invention. The battery may be either of a single cell structure or a multi-layer cell structure, and can be practiced as a primary or secondary battery.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate embodiments of the present invention. In such drawings.

Figure 4A:
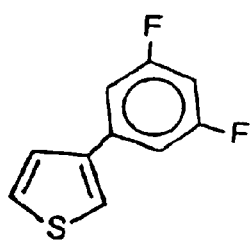
Figure 4B:
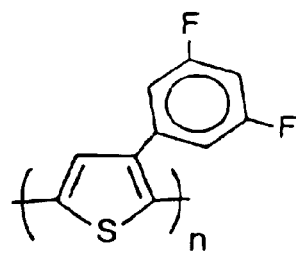
Figure 5:
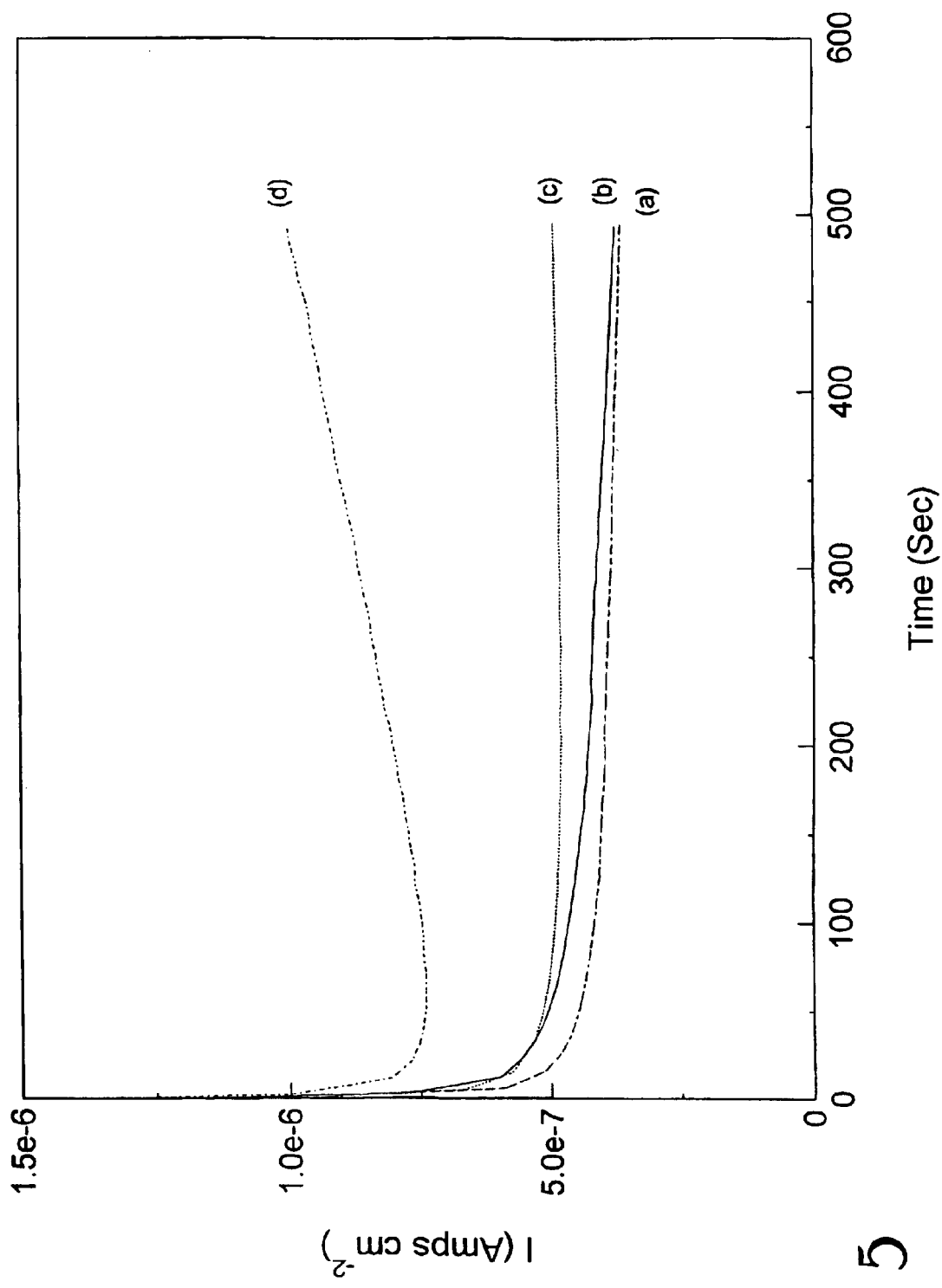
Figure 6:
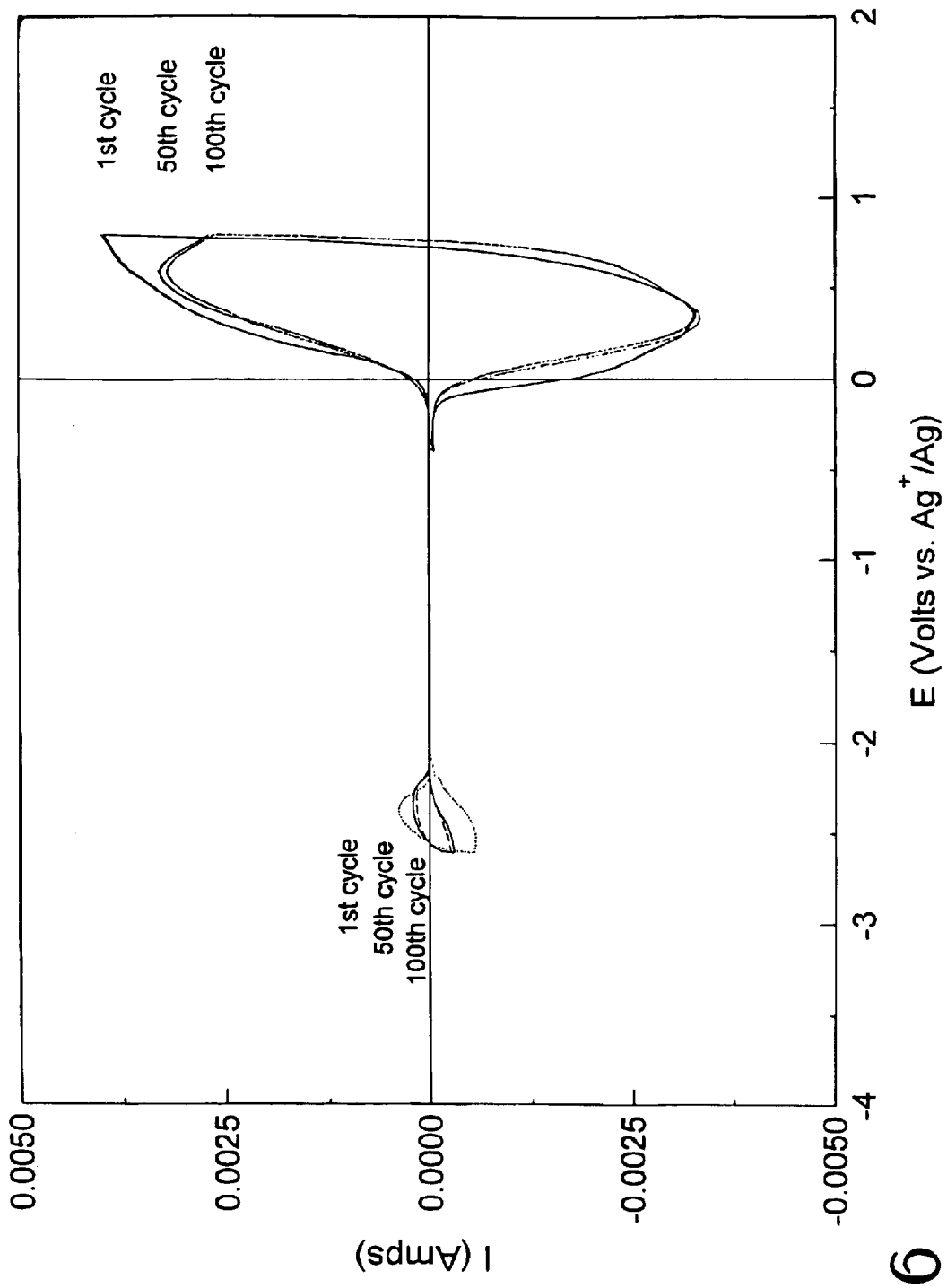
Figure 7:
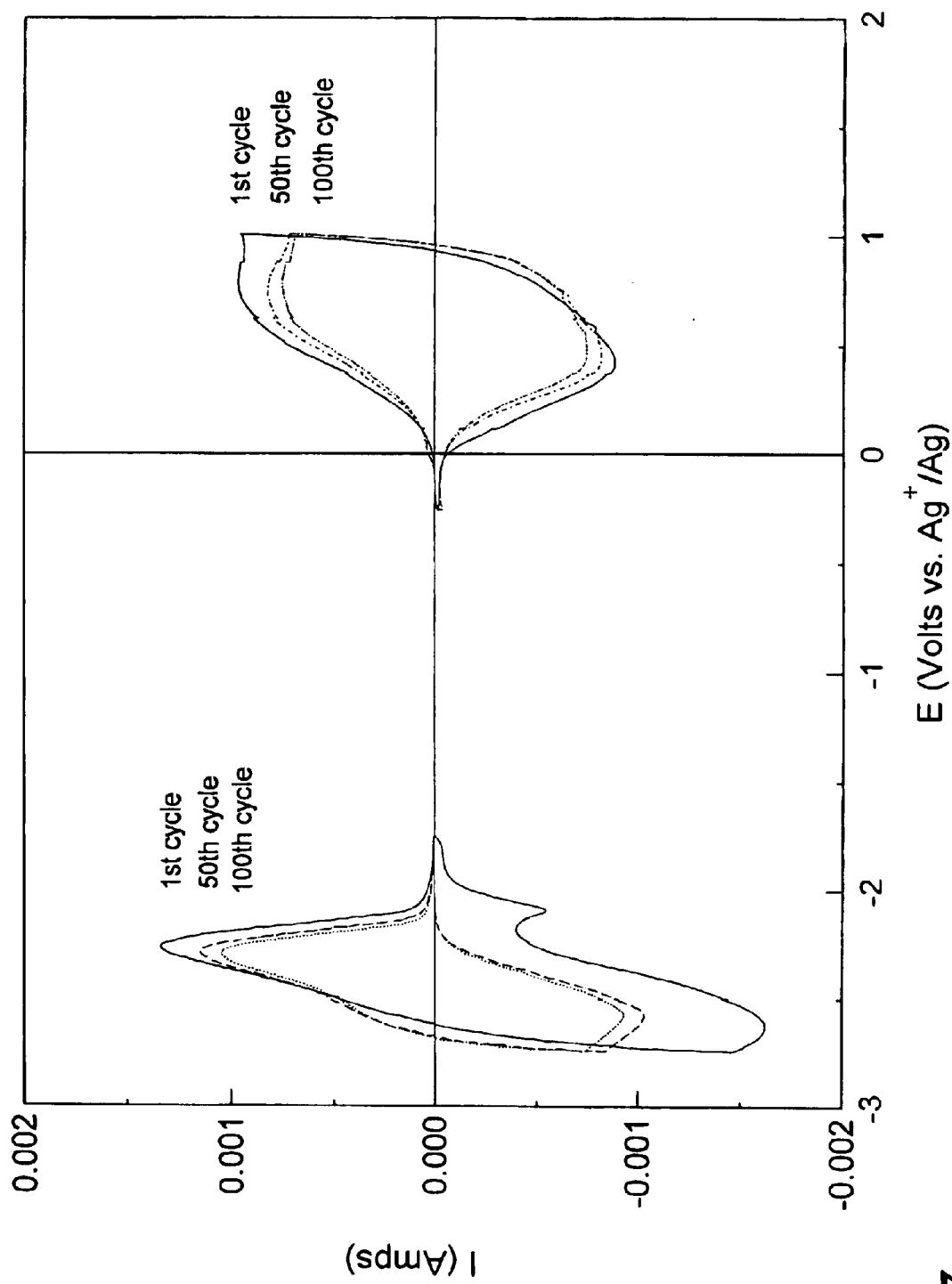
Figure 8:
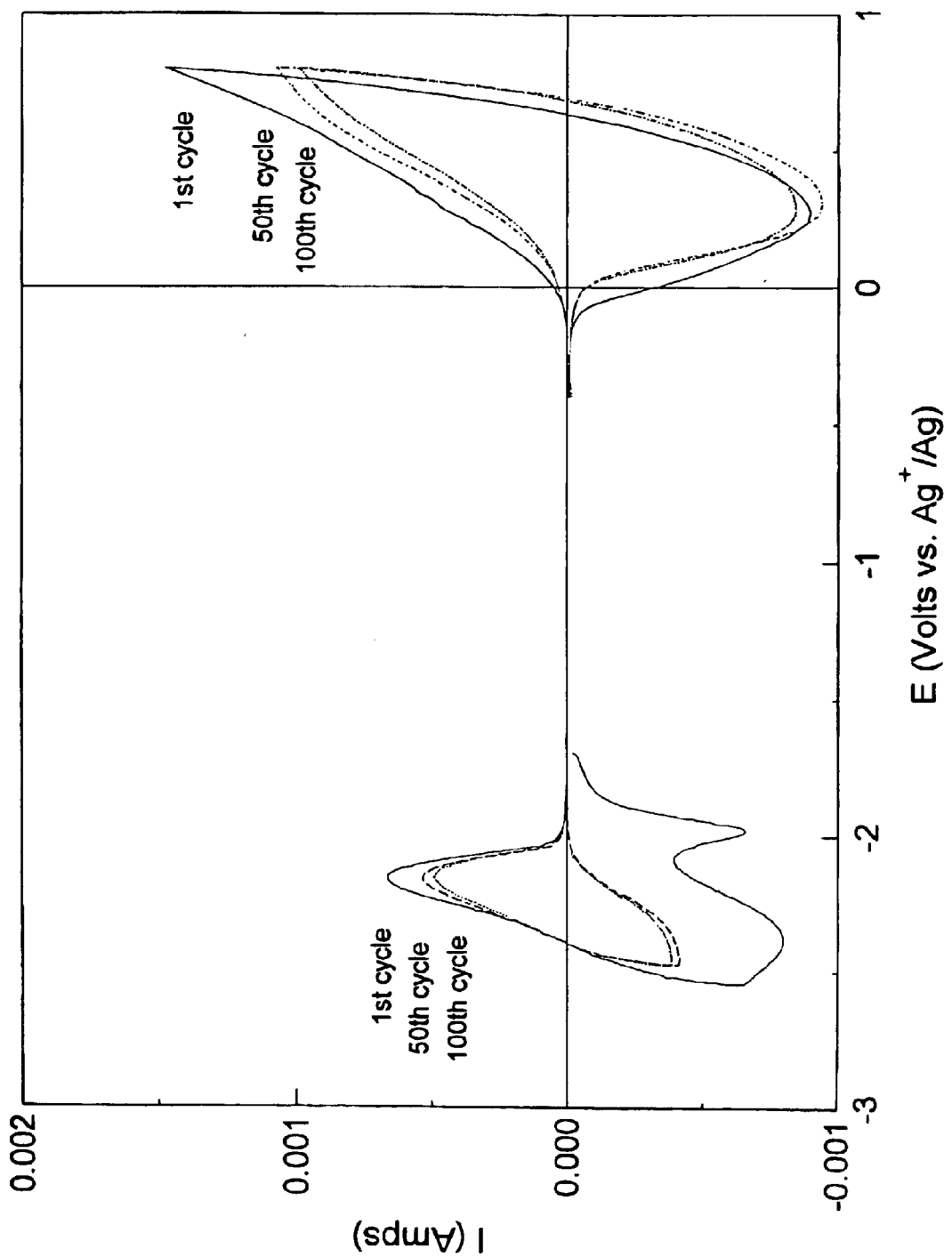
Figure 10A:
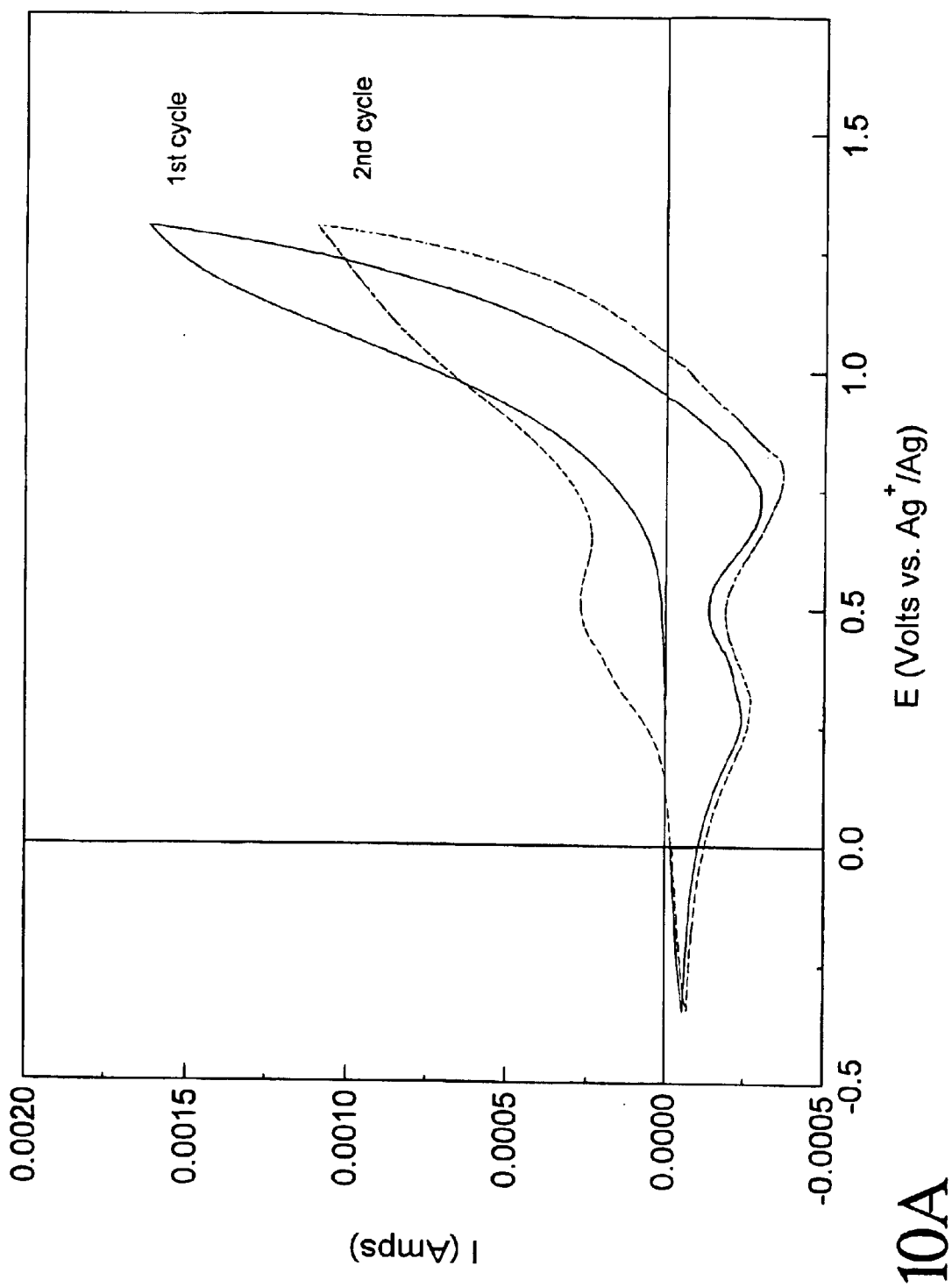
Figure 10B:
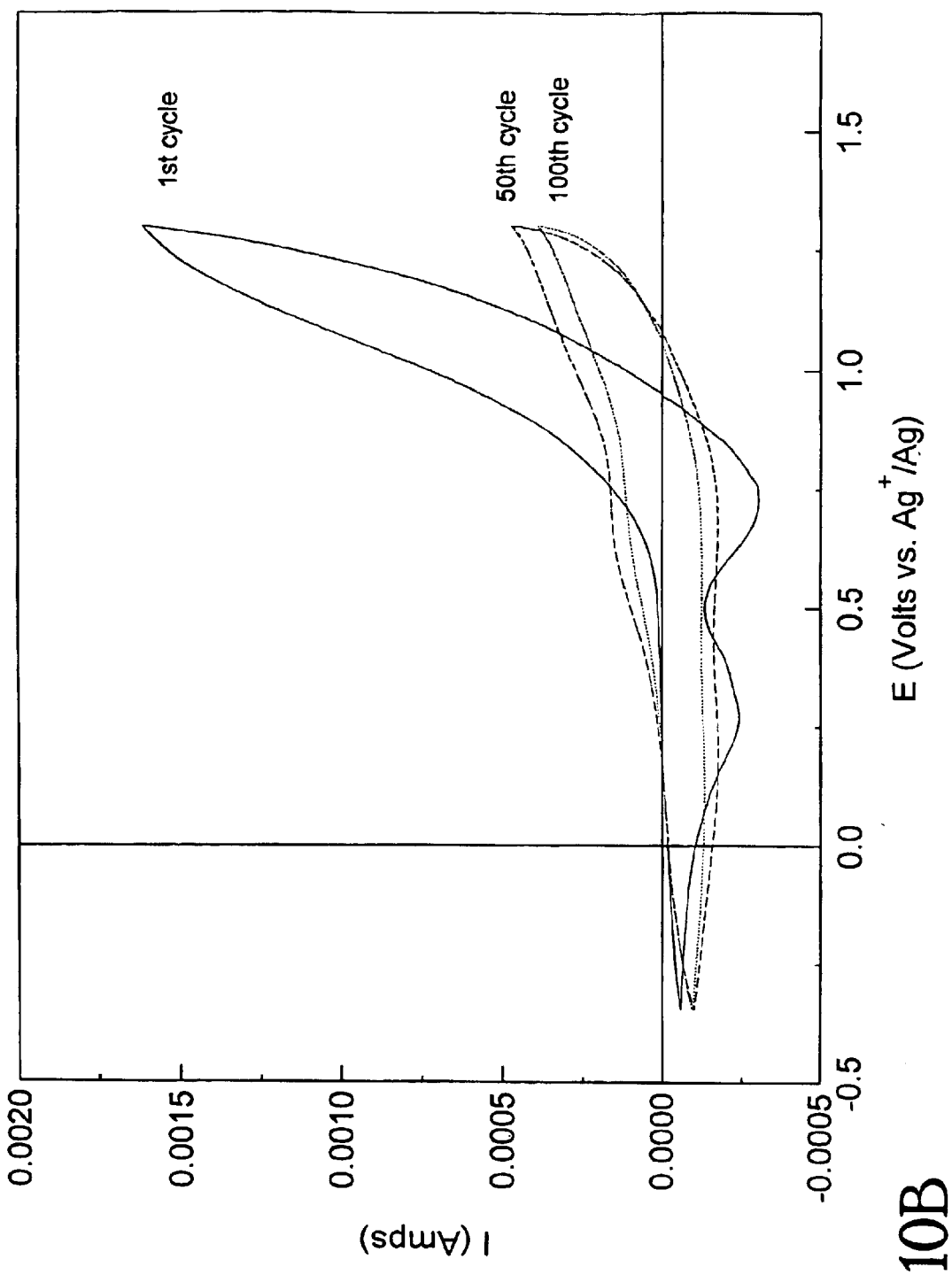
Figure 11:
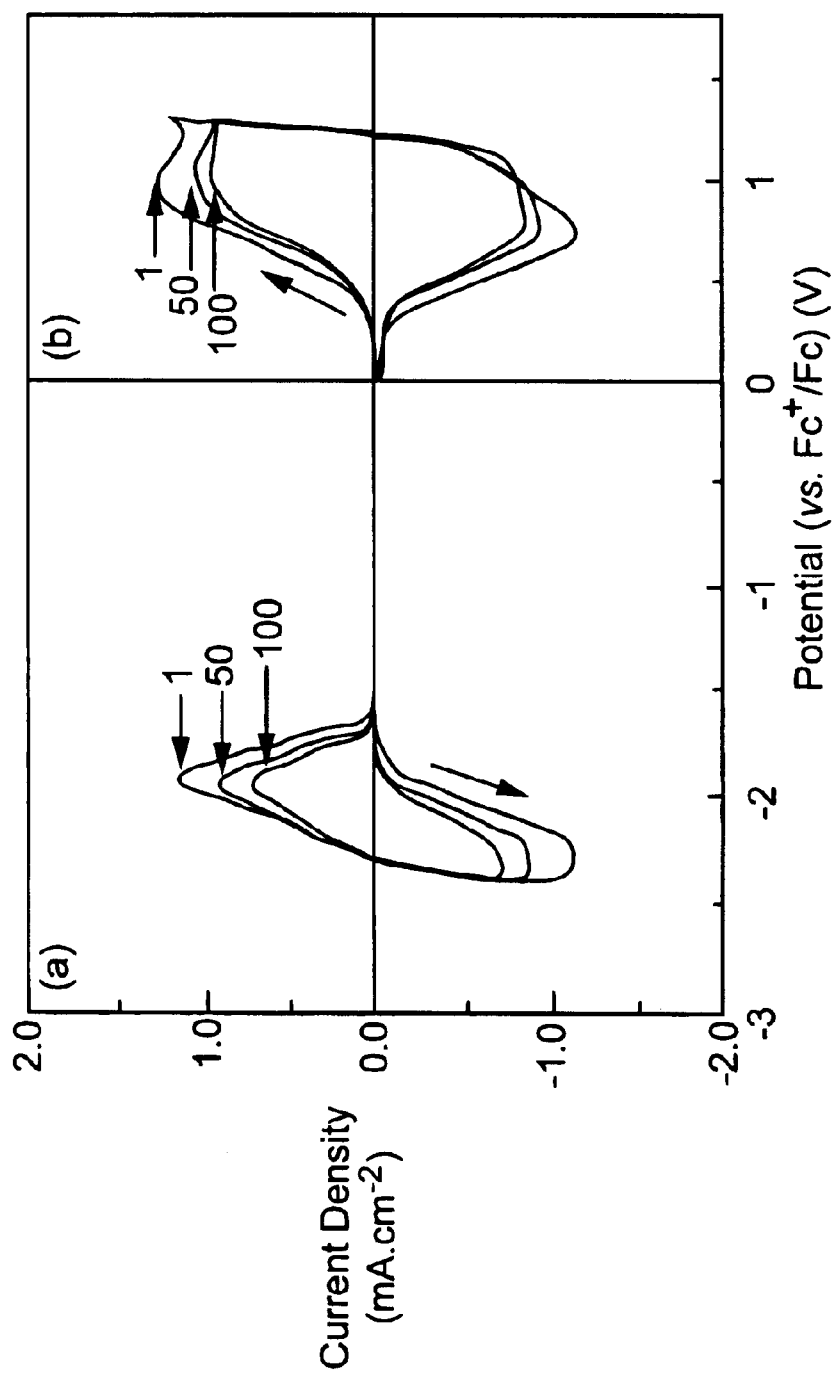
Figure 12:
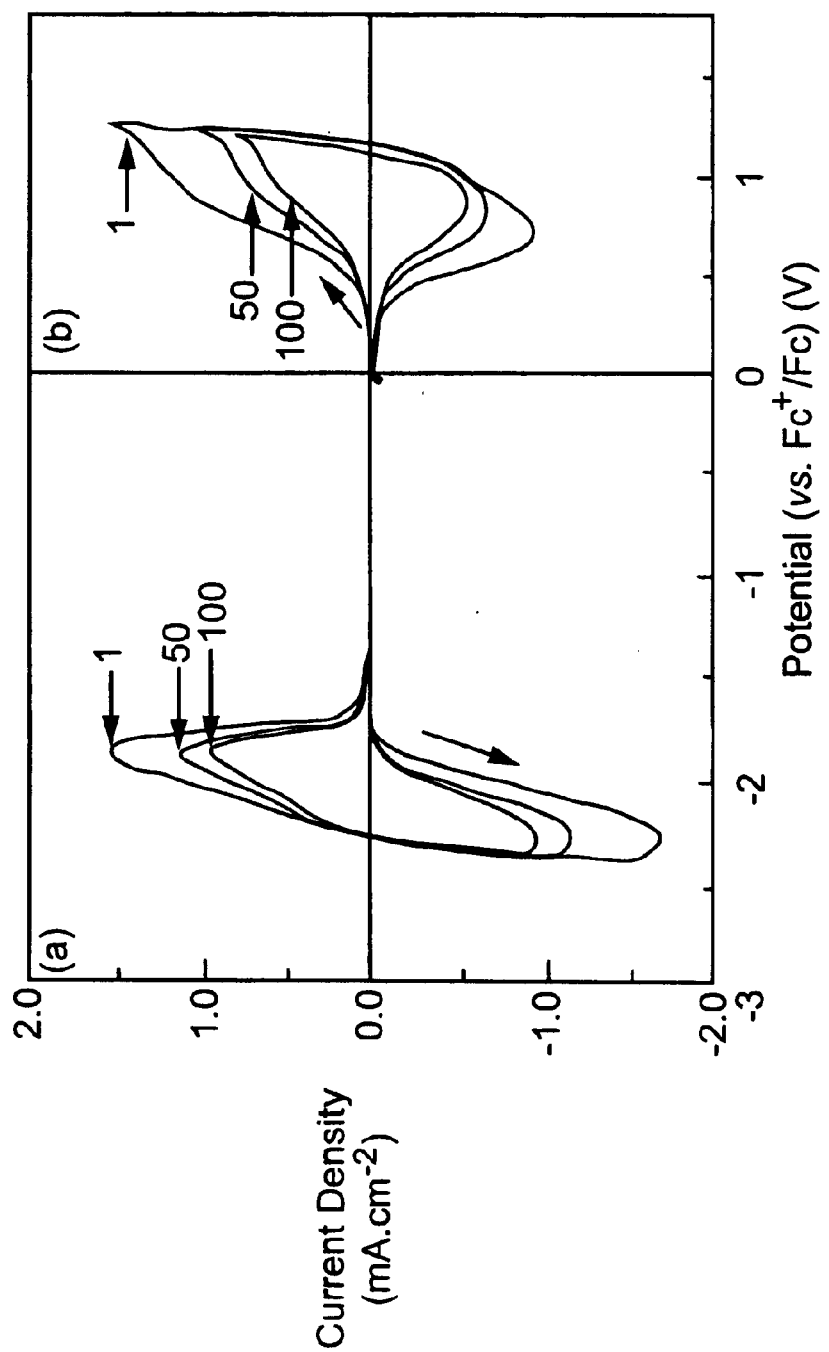

(A) 1,4-bis(2-thienyl)- benzene (THB);

(B) 1,4-bis(2-thienyl)-2-fluorobenzene (TFP);

(C) 1,4-bis(2-thienyl)-2,5-difluorophenylene (TF2P); and (D) 1,4-bis(2-thienyl)-2,3,5,6-tetrafluoro-phenylene (TF4P);

FIGS. 4 A–B show the structure of 3(3,5-difluorophenyl) thiophene monomer (FIG. 4A) and a schematic view representing an electrically conducting polymer having a backbone of 3(3,5-difluorophenyl)thiophene (FIG. 4B);

FIG. 5 shows Current-Time curves for 0.1M TFP in 0.25M Tetrabutylammonium tetrafluoroborate ($TBABF_4$) in sulfolane at (a) 0.68V, (b) 0.69V, (c) 0.71V and (d) 0.72V. The polymerization potential is 0.72V, as evidenced by the controlled increase in current;

FIG. 6 show cyclic voltammograms for pTHB in 0.25M $TBABF_4$ in sulfolane showing the $1^{st}$, $50^{th}$ and $100^{th}$ cycles for n-doping and p-doping;

FIG. 7 show cyclic voltammograms for pTFP in 0.25M $TBABF_4$ in sulfolane showing the $1^{st}$, $50^{th}$ and $100^{th}$ cycles for n-doping and p-doping;

FIG. 8 show cyclic voltammograms for pTF2P in 0.25M $TBABF_4$ in sulfolane showing the $1^{st}$, $50^{th}$ and $100^{th}$ cycles for n-doping and p-doping;

FIGS. 9 A–C show neutralization charge associated with p-doping versus cycle number for films with (open circles) and without (filled circles) conditioning for (A) pTHB, (B) pTFP and (C) pTF2P;

FIGS. 10 A–B shows cyclic voltammograms for p-doping of pTF4P in 0.25M $TBABF_4$ in sulfolane showing the first and second p-doping/neutralization peaks (FIG. 10A). The inset shows the $1^{st}$, $50^{th}$ and $100^{th}$ cycles for the first p-doping/neutralization peak (FIG. 10B);

FIG. 11 shows cyclic voltammograms for pTFP in 0.25M $TBABF_4$ in 2M diethyl sulfone/sulfolane showing the $1^{st}$, $50^{th}$ and $100^{th}$ cycles for n-doping and p-doping; and FIG. 12 show cyclic voltammograms for pTFP in 0.25M $TBABF_4$ in sulfolane/triglyme (1:1 v/v) showing the $1^{st}$, $50^{th}$ and $100^{th}$ cycles for n-doping and p-doping.

DETAILED DESCRIPTION OF THE INVENTION

The present invention provides a method of conditioning polymeric electrode materials so as to improve their charge capacities and enhance their abilities to undergo multiple doping and undoping cycles with high cycling efficiency and chemical stability. Polymers having a lower polymerization potential than p-doping peak are selected and electrochemically conditioning according to the method of the present invention. Especially suited for this invention are (1) a series of fluorophenyl thiophene polymers synthesized by devising preparatory techniques to systematically vary the number and position of the fluorine on the phenyl group; and (2) a series of different phenylene-thienyl based polymers synthesized by devising preparatory techniques to systematically vary the number and position of the fluorine on the phenyl group. As a non-limiting example of the method of conditioning such polymers, the detailed description of the manufacture and conditioning of the preferred embodiment of the present invention including the use of phenylene-thienyl based polymers and their incorporation into an electromechanical storage cell is provided below.

Figure 1:
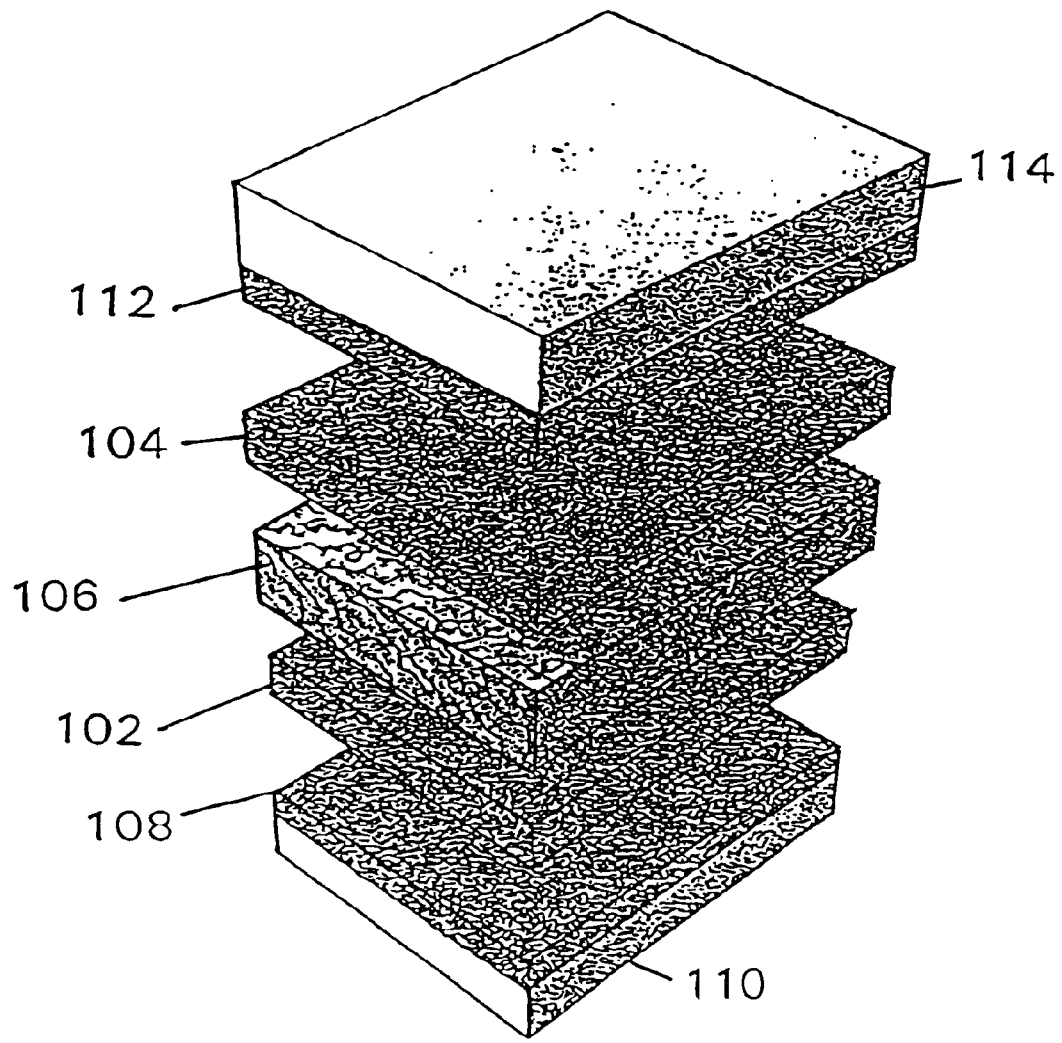
FIG. 1 shows an exploded view of the construction of an electrochemical storage cell in accordance with one or more embodiments of the present invention.
Figure 2:
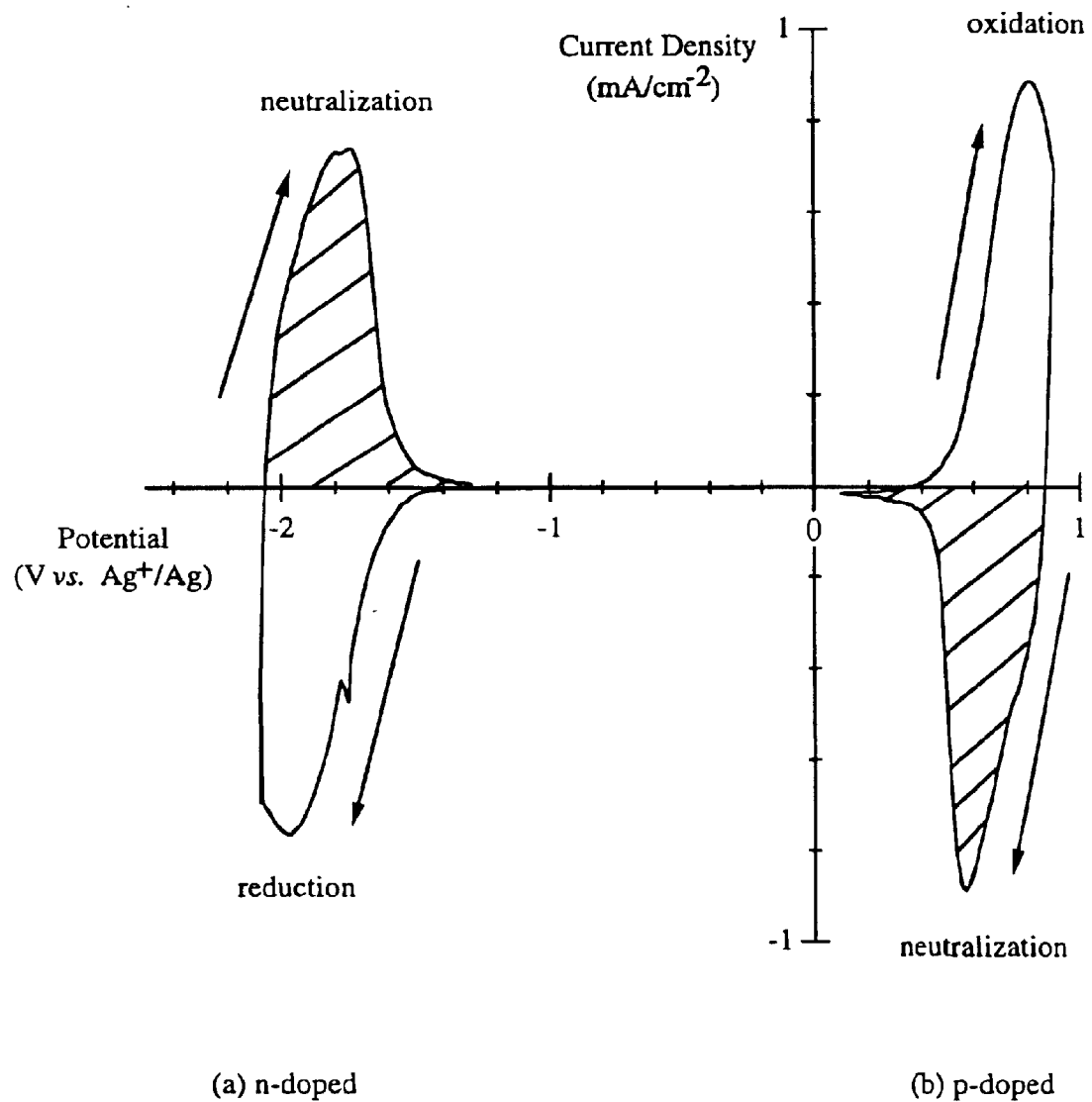
FIG. 2 shows a typical voltammogram for an electronically conducting polymer that exhibits n-doping and p-doping.

An electrochemical storage cell which includes electrodes conditioned by the method of the present invention is generally designated in FIG. 1 by reference numeral 100, includes a first electrode 102, a second electrode 104, and an electrolyte material 106 positioned there between and having opposing surfaces respectively interfacing with first surfaces (unnumbered) of the electrodes 102 and 104. The first electrode 102 contains a current collector 108 with support 110, the current collector 108 being disposed on a second surface (unnumbered) of the first electrode 102 opposing the first surface of the first electrode 102. The second electrode 104 also contains a current collector 112 with support 114, the current collector 112 being disposed on a second surface (unnumbered) of the second electrode 104 opposing the first surface of the second electrode 104. The first electrode 102 is designated herein as a positive electrode (cathode), and the second electrode 104 as a negative electrode (anode). FIG. 2 shows a typical voltammogram for an electronically conducting polymer that exhibits (a) n-doping (partial reduction) and (b) p-doping (partial oxidation).

Although not illustrated in FIG. 1, a conventional liquid electrolyte can be provided as the electrolyte material 106. In such an arrangement, the cell can further include a diaphragm or separator (not shown) to separate the anode from the cathode. Porous or semipermeable polymeric or glass materials can be selected for preparing the separator.

In order to avoid gradual oxidation of the one or more electrically conductive polymeric electrodes and diminishment to the capacities of the cell or battery, the cell or battery should be closed in order to produce a substantially oxygen- and water-free state. Thus, the cell or battery should be enclosed in a hermetically sealed case (not shown) prepared from, for example, a metal or plastic or combination thereof.

The thickness of the first electrode 102 and the second electrode 104 greatly influence the overall capacity of the cell 100. For most practical applications, the electrodes 102 and 104 each generally have a thickness in the range of from about 10 nm to about 1 mm, and preferably in the range of from about 0.1 to about 100 μm.

The current collectors 108 and 112 can be prepared from a metallic substrate, including such elemental metals as platinum, palladium, gold, silver, copper, titanium, and any combinations thereof, or alloys such as stainless steel. Alternatively, the current collectors 108 and 112 can be prepared from carbon, graphite, or carbon or graphite dispersed on a plastic matrix such as TEFLON, polyethylene, Kapton, or polyvinylenedifluoride.

As a further alternative, the current collectors 108 and 112 can be prepared as a composite of carbon or graphite dispersed in similar plastic matrices supported by an imbedded metal mesh. The metal mesh can be elemental metals such as aluminum, titanium, gold, copper, nickel and iron, and any combinations thereof, or alloys such as stainless steel.

The current collectors 108 and 112 generally can have a thickness in the range of from about 100 nm to about 1 mm. In the case where carbon or graphite films serve as one or more of the current collectors 108 and 112, the film thickness of each collector 108 and 112 is generally in the range of from about 1 μm to about 1 mm, and preferably is in the range of about 1 μm to about 10 μm. Where a metal or an alloy serves as one or more of the current collectors 108 and 112, each metal substrate generally will be self-supporting—i.e., not requiring supports 110 and 114—if the thickness of the metal or alloy substrate is at least about 5 μm. Practically, the metal or alloy substrate also can have a thickness in the range of from about 10 nm to about 1 mm.

The supports 110 and 114 are preferably defined by films prepared from tetrafluoroethylene polymers (TEFLON) or polyethylene, and each can have a thickness in the range of from about 10 nm to about 1 mm, and preferably in the range of from about 10 μm to about 500 μm.

Where an electrolyte film gel is employed as the electrolyte material 106, the electrolyte film generally can have a thickness in the range of about 100 nm to about 1 mm, and preferably in the range of about 10 μm to 1 mm. The thickness of the film of electrolyte material 106 can be controlled by preparing the electrolyte by spin or dip coating.

Electrodes which are manufactured according to the method of the present invention and employed in an electromechanical storage cell such as that of FIG. 1 with the current collectors 108 and 112, and the electrolyte collectively provide for a thickness in the range of from about 10 μm to about 2 mm, and more preferably from about 50 μm to about 500 μm.

According to a first embodiment of the present invention, at least one, and preferably both, of the first and second electrodes 102 and 104 are manufactured from at least one electrically conductive phenylene-thienyl polymer. Suitable phenylene-thienyl polymers include, for example:

(i) poly(1,4-bis(2-thienyl)-benzene) (pTHB);
(ii) poly(1,4-bis(2-thienyl)-2-fluorobenzene) (pTFP);
(iii) poly(1,4-bis(2-thienyl)-2,5-difluorophenylene) (pTF2P); and
(iv) poly(1,4-bis(2-thienyl)-2,3,5,6-tetrafluorophenylene) (pTF4P).

The structure of THB, TFP, TF2P and TF4P monomers are shown in FIGS. 3A–D.

Examples of other polymer compounds which would be suitable for use as electrodes, are disclosed in the aforementioned co-pending U.S. patent application Ser. No. 08/961,100. In that reference, it was disclosed that the present inventors synthesized: (1) a series of fluorophenyl thiophene polymers which demonstrated electrical conductive properties. Suitable other polymers which can be used for electrodes include, for example:

poly(3(2-fluorophenyl)thiophene),
poly(3 (3-fluorophenyl)thiophene),
poly(3(2,4-difluorophenyl)thiophene),
poly(3(3,4-difluorophenyl)thiophene),
poly(3(3,5-difluorophenyl)thiophene), and
poly(3(3,4,5-trifluorophenyl)thiophene).

As an example, the structure of 3(3,5-difluorophenyl) thiophene monomer is shown in FIG. 4A. FIG. 4B is a schematic view representing an electrically conducting polymer having a backbone of 3(3,5-difluorophenyl) thiophene.

Metallics which are suitable for use as the second electrode are well known in the art and include, for example, zinc, copper, silver and alloys thereof.

In a preferred embodiment, a phenylene-thienyl based polymer or a blend of phenylene-thienyl based polymers forms at least one of the electrodes 102 and 104.

In a more preferred embodiment, both electrodes (cathode and anode) are formed from a phenylene-thienyl based polymer.

Figure 3A:
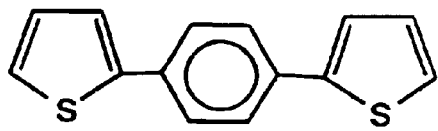
FIGS. 3 A–D are the molecular structure of four phenylene-thienyl-based monomers which are examples of monomers which can be used in the present invention.
Figure 3B:
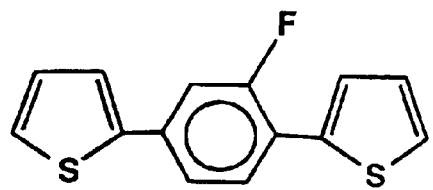
Figure 3C:
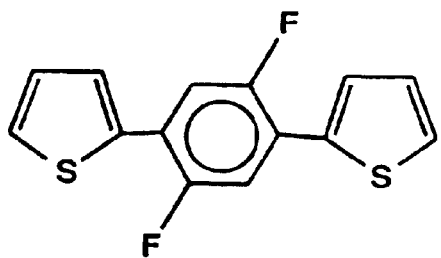
Figure 3D:
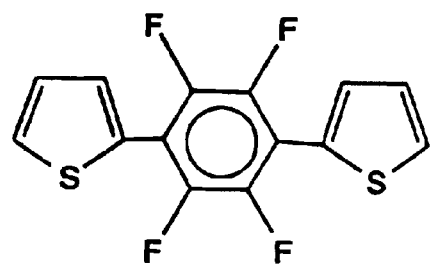

In a most preferred embodiment, 1,4-bis(2-thienyl)-2-fluorobenzene (TFP) is used as the monomer constituent for the phenylene-thienyl based polymer electrodes. The structure of TFP is shown in FIG. 3B. This compound is selected as the electrically conductive polymer of both the cathode 102 and the anode 104 since it exhibits high charge capacity in the p-doped state and n-doped state with very good reversibility.

The monomers selected to prepare the fluoro-substituted phenylene-thienyl based polymers can be synthesized by, for example, a coupling reaction between zinc complexes of various fluorosubstituted 1,4-dibromo phenylene reagents and commercially available thiophenes. This coupling reaction occurs in the presence of a tetrakis (triphenylphosphine) palladium [Pd(PPh$_3$)$_4$] catalyst, and preferably under non-aqueous conditions and in a dry argon atmosphere. This synthesis route provides for high isolated yields of 40–70%.

The yield of the phenylene-thienyl based monomers were optimized by controlling the reaction time, temperature, and the fluoro-substituted 1,4-dibromophenylene reagent of the coupling reaction mixture. For example, 1,4 bis(2-thienyl)-benzene, 1,4 bis(2-thienyl)-2-fluorobenzene, 1,4 bis(2-thienyl)-2,5-difluorophenylene and 1,4 bis(2-thienyl)-2,3,5,6-tetrafluorophenylene are prepared by allowing the coupling reaction to proceed for about 24 hours at about 60–85° C. The completion of the coupling reaction can be monitored by thin layer chromatography and gas chromatography. Example procedures for preparing each of these fluoro-substituted phenylene-thienyl based polymers are set forth below.

When only one electrode is manufactured using the preferred phenylene-thienyl based polymers, the other electrode can be manufactured using other polymers such as, for example, fluorophenyl thiophene polymers. The monomers selected to prepare fluoro-substituted phenylthiophene polymers can be synthesized by, for example, a coupling reaction between zinc complexes of various fluoro-substituted 1-bromophenyl reagents and commercially available 3-bromothiophene. This coupling reaction occurs in the presence of a [1,1-bis(diphenylphospheno)ferrocene] palladium (II) chloride ("Pd(dppf)Cl$_2$") catalyst, and preferably under nonaqueous conditions and in a dry argon atmosphere. This synthesis route provides for high isolated yields of 70% or higher.

The yields of the fluoro-phenylthiophene were optimized by controlling the reaction time, temperature, and the fluoro-substituted 1-bromophenyl reagent of the coupling reaction mixture. For example, 3(3,4,5-trifluorophenyl) thiophene, 3(3,4-difluorophenyl)thiophene, and 3(3,5-difluorophenyl) thiophene are prepared by allowing the coupling reaction to proceed for about 30 minutes at about 60° C. 3(2,4-difluorophenyl)thiophene, 3(2-fluorophenyl)thiophene, and 3(3-fluorophenyl) thiophene can be prepared by allowing the coupling reaction mixture to reflux for 10, 2, and 0.75 hours, respectively. The completion of the coupling reaction can be monitored by gas chromatography. Example procedures for preparing each of these fluoro-substituted phenylthiophene polymers are set forth in the aforementioned copending application U.S. patent application Ser. No. 08/961,100.

The polymeric films defining the electrodes 102 and 104 manufactured according to the method of the present invention can be prepared, for example, by: (1) homopolymerizing the phenylene-thienyl based monomers or the fluorophenyl-based monomers and; (2) copolymerizing blends of two or more phenylene-thienyl based monomers; (3) copolymerizing a blend of the phenylene-thienyl based monomers with other monomers such as, for example, the fluorophenyl-substituted thiophene monomers described above; (4) copolymerizing blends of 2 or more fluorophenyl compounds; or (5) copolymerizing blends of one or more phenylene-thienyl based monomers with one or more copolymerizable monomers and/or blends of one or more fluorophenyl-substituted thiophene monomers with one or more copolymerizable monomers.

Varied types of techniques have been employed for conducting the homo- or co-polymerization. These techniques include chemical polymerization, for example in the presence of oxidizing agents, or more preferably by electropolymerization.

Electropolymerization is usually heterogenous insofar as it involves polymerizing the monomers on the conducting substrate to form a solid phase. Polymerization is initiated by applying an oxidizing potential to the substrate. The oxidizing potential applied across the substrate should be equal to or greater than the threshold polymerization potential of the monomer(s) in order to initiate polymerization. As referred to herein, the threshold polymerization potential means a threshold potential at which a current begins to flow across the polymerizable solution and the monomers begin to polymerize on the substrate. An external circuit with a current sensing meter can be utilized to determine when the current begins to flow. For example, FIG. 5 shows Current-Time curves for 0.1M TFP in 0.25M Tetrabutylammonium tetrafluoroborate (TBABF$_4$) in sulfolane at (a) 0.68V, (b) 0.69V, (c) 0.71V and (d) 0.72V. The polymerization potential is 0.72V, as evidenced by the increase in current. Alternatively, the threshold polymerization potential can be estimated visually by formation of the polymer on the substrate, although some degree of polymerization must occur before visual detection is possible.

The polymerization potentials of the monomers of the present invention were found to be accessible in solvents such as propylene carbonate or sulfolane, resulting in the deposition of high quality films. Sulfolane is the preferred solvent. The temperature at which the electropolymerization is carried out is generally about room temperature, although temperatures ranging about 20° C. higher and 20° C. lower than room temperature can be employed. The electropolymerization can be carried out at atmospheric pressure.

Suitable substrates for the electropolymerization of the fluoro-substituted phenylene-thienyl based monomers include, by way of example, platinum, palladium, gold, silver, titanium, copper, stainless steel, and any combinations thereof. Carbon, graphite, conducting tin oxide, and carbon-doped polyethylene can also be selected as the substrate for the electro polymerization. These substrates can serve as the current collectors 108 and 112 of the cell 100; accordingly, electropolymerization can obviate the need for an additional preparatory step of transferring the polymeric electrodes 102 and 104 to the current collectors 108 and 112, respectively.

In the preferred embodiment the monomers, 1,4-bis(2-thienyl)- 2-fluorobenzene (TFP), are electropolymerized from a solution of 0.1 M monomer with 0.25 M Tetrabutylammonium tetrafluoroborate (TBABF$_4$) as supporting electrolyte in sulfolane solvent. If alternative phenylene-thienyl monomers are not sufficiently soluble in a sulfolane solvent, they can be electropolymerized from a solution of 0.05 M monomer with 0.25 M TBABF$_4$ in a mixture of sulfolane and γ-butyrolacetone 1:1 (v/v) and 1:3 (v/v), respectively. Counter electrodes are filled with the same electrolyte but without the monomer. A clean platinum disc substrate is placed into the working electrode compartment close to the Luggin capillary of the reference electrode compartment. Electropolymerization potential is determined by increasing the potential applied to the working electrode by 10 mV steps and is defined as the lowest potential at which a progressive increase in the electrode current is observed. Electropolymerization is continued until a sufficient thickness of the polymer film is deposited. The thickness of the film deposited is dependent upon the intended use of the electrode being manufactured. A thickness of about 100 mC cm$^{-2}$ is sufficient to provide an electrode for use as an anode or a cathode according to the present invention. Depending upon the requirements of the electrochemical storage cell, the thickness of the electrode can be about 10 nm to about 2 mm, and preferably in the range of from about 50 μm to about 500 μm.

The as-deposited polymer is neutralized by scanning the potential at 1 mV$_{31\ 1}$ from the Open Circuit Potential (OCP) to 0.0V. The Open Circuit Potential is the thermodynamic equilibriam between two electrodes. The potential is held at 0.0V for 5 minutes to ensure complete neutralization of the as-deposited polymer film.

Critical to the method of the present invention, the neutral polymer film is then subjected to a electrochemical conditioning step. The neutralized polymer film is transferred from the polymerization solution into a clean solution of 0.25 M TBABF$_4$ in sulfolane. The polymer is then held at a potential corresponding to the p-doping scan limit until the current decreased to less than 10 μA cm$^{-2}$. The film is then neutralized by scanning from the conditioning potential to 0.0V. The changes associated with this process is then used to determine the mass of the polymer film from a previously generated calibration curve. The potential limits selected for this conditioning step are preferably at least about 100, and more preferably about 100 mV to about 250 mV beyond the current peak associated with the p-doping process. The optimum potential window is selected to obtain the highest discharge efficiency and charge capacity. It has been discovered that the charge capacity and cycling efficiency values are very sensitive to the potential window chosen. In general, an increase in the potential limits for doping results in an increase in the doping density and a corresponding decrease in the cycling efficiency of the resulting polymer electrode.

In addition, if desirable, conventional additives such as graphite, carbon black, acetylene black, metal powder, or carbon fiber may be incorporated in the polymeric electrolyte of the present invention, although the electrodes are preferably prepared without such additives.

Secondary batteries which employ polymeric electrodes conditioned according to the method of the present invention may be either initially assembled in a charged state, or initially assembled in an uncharged state, and subsequently converted in situ to such charged state by means of electrochemical doping. Preferably, the cells are assembled in the fully neutralized state to ensure that the electrolyte concentration in the gel does not exceed the solubility limit in the fully discharged state during cycling, that is, to ensure that the electrolyte salt does not precipitate out during discharge of the cell.

For example, the electrochemical doping technique can be applied by charging the electrochemical cell 100 by connecting a direct current (DC) voltage source to the electrodes 102 and 104. In particular, the positive potential of the voltage source is applied to the polymeric electrode selected as the cathode, and a negative potential is connected to the polymeric electrode selected as the anode. The application of the positive potential to the neutral polymer selected as the cathode effects an increase in the oxidation state of the polymer by electron transfer from the polymer, imparting a net positive charge to the polymer. Consequently, the polymer forming the cathode attracts anions from the electrolyte 106 as counter ions to maintain the electrical neutrality in the polymer. On the other hand, application of the negative potential to the neutral polymer selected as the anode effects a decrease in the oxidation state of the polymer by electron transfer to the polymer, imparting a net negative charge to the polymer. Consequently, the polymer forming the anode attracts cations from the electrolyte 106 as counter ions to maintain the electrical neutrality in the polymer.

The doping level can be controlled by measuring the quantity of electricity flowing during charging of the cell or by measuring the voltage. Doping may be carried out under constant current or constant voltage conditions or under a varying current or varying voltage condition. The doping current, voltage, and time vary depending on the kind, bulk density, and area of the polymeric electrode, the electrolyte salt and solvent selected, and the desired temperature.

A practical charge storage device utilizing conducting polymers for both anode and cathode requires not only the selection of materials that can be n-doped and p-doped, respectively, to provide adequate charge capacities, but also an electrolyte that is compatible with the selected materials. That is, the electrolyte salt and solvent selected should allow a sufficiently large potential range to attain the polymerization potential, as well as the full n-doped and p-doped states, of the polymers.

According to a preferred embodiment of the present invention, the electrolyte selected is an ionically conducting polymer gel. Exemplary cations for preparing the electrolyte salts that can be employed in accordance with the present invention include, without limitation, cations of tetraalkyl ammonium, sodium, lithium, potassium, silver, and magnesium. Exemplary anions for preparing the electrolyte salts suitable for the present invention include, without limitation, tetrafluoroborate ($BF_4^-$), hexafluoroarsenate ($AsF_6^-$), hexafluorophosphate ($PF_6^-$), hexafluoroantimonate ($SbF_6^-$), trifluoromethane sulfonate ($CF_3SO_3^-$), bis-trifluoro methylsulfonyl imide or "imid salt" (($CF_3SO_2)_2N^-$), cyclic imid salt, perchlorate ($ClO_4^-$), thiocyanate ($SCN^-$), and iodide ($I^-$). For example, among the salts that can be practiced with the present invention are the following: tetrabutylammonium hexafluoro phosphate, lithium tetrafluoroborate, tetraethylammonium tetrafluoborate, tetrabutylammonium tetrafluoroborate, lithium perchlorate, tetrabutylammonium perchlorate, tetraethyl ammonium perchlorate, tetramethyl ammonium trifluoromethane sulfonate, and tetrabutylammonium hexafluorophosphate. Preferably, tetrabutylammonium tetrafluoroborate is selected as the electrolyte salt, since this salt has been shown to have high solubility and electrochemical stability and provides good cycling efficiency for the conducting polymers.

Suitable electrolyte solvents include, by way of example, the following: ethers, such as tetrahydrofuran (THF), dimethoxyethane, dioxolane, 2-methyltetrahydrofuran, and diethyl ether; esters, such as γ-butyrolactone, propylene carbonate, ethylene carbonate, dimethyl carbonate, diethyl carbonate, dibutyl carbonate, methyl formate, ethyl formate, ethyl acetate, and methyl acetate; nitrogen-containing compounds such as nitrobenzene, nitromethane, acetonitrile, benzonitrile, N,N-dimethylformamide, N,N-dimethylacetamide, nitroethane, and propylonitrile; sulfur-containing organic compounds, such as dimethylsulfoxide and sulfolane; and others such as dichloromethane and acetone. Preferably, propylene carbonate or sulfolane or combination thereof is selected as the electrolyte solvent. Most preferably sulfolane is selected as the electrolyte solvent.

Polymer gels are defined herein as mixed-phase materials with good ionic conductivity that can be solution cast into thin flexible films. The ability to solution cast the gel prior to gelation onto the electrodes ensures good contact between the polymer electrodes and the electrolyte film. Such casting can be performed by spin or dip coating, as well as other techniques known in the art. Optionally, the gel can be formed on a temporary substrate and transferred to the electrodes. Where the electrolyte is to prepared as a gelled film, suitable gelling agents that can be employed include: poly(ethyleneoxide), poly(propylene oxide), poly (vinylidene dichloride), poly(vinylsulfone), poly (vinylidenedifluoride), poly(2,2-dimethyltrimethylenecarbonate), poly(acrylonitrile), poly(vinylchloride), poly (ethyleneglycol), poly(propylene glycol), poly (tetrahydrofuran), poly(dioxolane), poly (siloxanes), poly (ethoxyethoxyethoxyvinylether), poly (phosphazene), poly (methylmethaacrylate), poly(styrene), poly[bis (methoxyethoxy)phosphazene], poly(acrylic acid), poly (methylacrylate), poly(vinylformal), poly(vinylene carbonate), poly(vinylacetate), poly(vinylpyrrolidone), poly (acrylamide), poly(ethoxy(proyleneglycol)acrylate), and others. Preferably, poly(acrylonitrile) is selected as the gelling agent.

The concentration of the electrolyte salt in the solvent depends upon the electrodes selected, the charging and discharging conditions, the operating temperature, and the specific electrolyte salt and solvent selected, and, therefore, is generally not defined. It is ordinarily preferred, however, that the concentration be about 0.1 to about 3 M, and most preferably about 1.0 M.

The charging of the electrodes is described above. In operation of the electrochemical cell, the electrodes are reversibly discharged.

For example, the cell reactions during discharge of a cell containing a poly(1,4-bis(2-thienyl)-2-fluorobenzene) anode, poly(1,4-bis(2-thienyl)-2-fluorobenzene) cathode, and tetrabutyl ammonium tetrafluoroborate in sulfolane electrolyte are as follows:

(1) Anode

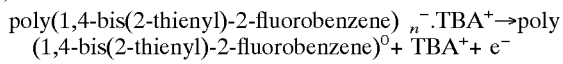

(2) Cathode

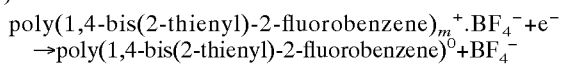

wherein TBA⁺ represents a tetrafluoroborate cation, $BF_4^-$ represents a tetrabutylammonium anion, and n and m denote the number of monomer units.

As evident from these equations, in the charged state both electrodes are fully doped so that during, discharge, the polymers are neutralized and the ion concentration in the electrolyte polymer gel increases as the charge compensating $TBA^+$ and $BF_4^-$ counter ions are ejected from the electrodes. Consequently, in order to optimize the cell electrochemical properties the minimum thickness of the gel film is determined by the solubility limit of the salt in the gel.

The following non-limiting examples serve to explain the preparation of the fluoro-substituted phenylene-thienyl based monomers and polymers, and the preparation and characteristics of an electrochemical cell containing such polymers, in more detail.

EXAMPLES

Example 1

Synthesis of Phenylene-thienyl Based Monomers.

(a) Synthesis of 1,4-bis(2-Thienyl)-benzene

A three-necked round-bottom flask (250 ml) was flame dried in an argon atmosphere for 10 to 15 minutes. Upon cooling under the argon atmosphere, 50 ml of freshly dried tetrahydrofuran (product #T 397-4, manufactured by Fisher Scientific) was previously distilled from a sodium/benzophenone mixture and directly drawn into the flask from the distillation head. A measured amount of thiophene (94 mmol) was added to THF in the reaction flask. Into this solution of thiophene and tetrahydrofuran at 0° C. was gradually added n-butyllithium (94 mmol) (product #23070-7, manufactured by Aldrich Chemical), which remained in an argon atmosphere and was stirred. After stirring for 3 hours at 0° C., a tetrahydrofuran solution of anhydrous zinc chloride ($ZnCl_2$) (94 mmol) (product #20808-6, manufactured by Aldrich Chemical) previously dried at 160° C. under vacuum conditions and weighed in the dry box, was gradually added to the lithium complex at 0° C. After stirring for 45 minutes at room temperature, the zinc complex suspension was transferred (e.g., via Teflon tubing) under argon pressure to a second three-necked round-bottomed flask (500 mL) containing a solution of 1,4-dibromobenzene (31 mmol) (product #D3902-9, manufactured by Aldrich Chemical) and $Pd(PPh_3)_4$ catalyst (product #0953, manufactured by Lancaster Synthesis, Inc.). This coupling reaction mixture was then reflux (e.g., via an oil bath) for 24 hours.

The completion of the coupling reaction was monitored by thin layer chromatography and gas chromatography using aliquot of reaction mixture after the work-up described below. When most of the 1,4-dibromobenzene was consumed as determined by gas chromatography, the crude reaction mixture was worked-up as follows: The reaction mixture was quenched with 10 mL of 5 wt. % aqueous sulfuric acid at room temperature. After evaporating the tetrahydrofuran using a rotary evaporator, dichloromethane (40 ml) and water (40 mL) were added to the crude reaction mixture and extracted. The organic layer was washed three times with water, and then was dried over anhydrous sodium sulfate, followed by evaporation. A yellowish solid resulted.

Purification of the crude product was carried out by column chromatography using silica gel (stationary phase) and n-pentane/dichloromethane mixture (as an eluent). The crude product was initially absorbed on the silica gel (about 4 to 5 grams) and charged on the column. The net weight ratio of crude product to the silica gel stationary phase was about 50:1. Chromatographic resolution was checked periodically by using a silica gel thin layer chromatography plate (product #Z12278-5, manufactured by Aldrich Chemical) and n-pentane as the eluent. 1,4-bis(2-thienyl)-benzene obtained was 98 to 99% pure product, as observed by capillary gel electrophoresis.

(b) Synthesis of 1,4-bis(2-Thienyl)-2-Fluorophenylene

The same procedures set forth above in Example A(1)(a) for synthesizing 1,4-bis(2-thienyl)-benzene were followed, with the exception that 1,4-dibromo-2-fluorobenzene was substituted for 1,4-dibromobenzene as the 1,4-dibromosubstituted fluorobenzene.

(c) Synthesis of 1,4-bis(2-Thienyl)2,5-difluorophenylene

The same procedures set forth above in Example A(1)(a) for synthesizing 1,4-bis(2-thienyl)-benzene were followed, with the exception that 1,4-dibromo-2,5-difluorobenzene was substituted for 1,4-dibromobenzene as the 1,4-dibromo-substituted fluorobenzene.

(d) Synthesis of 1,4-bis(2-Thienyl)-2,3,5,6-tetrafluorophenylene

The same procedures set forth above in Example A(1)(a) for synthesizing 1,4-bis(2-thienyl)-benzene were followed, with the exception that 1,4-dibromo-2,3,5,6-tetrafluorobenzene was substituted for 1,4-dibromobenzene as the 1,4-dibromo-substituted fluorobenzene. The coupling reaction mixture was heated to reflux in an oil bath for 24 hours. The product obtained was 97 to 98% pure.

Example 2

Preparation of an Electrode

The monomers TFP and TF2P were successfully electropolymerized from 0.25 M $TBABF_4$ in sulfolane as a dark green-blackfilm on the surface of the platinum electrode. After neutralization, the film became yellow-green in color. The as-deposited polymer films were slightly soluble in tetrahydrofuran (THF) and propylene carbonate (PC). The neutralized polymer electrodes so prepared can then be electrochemically conditioned according to the method of the present invention. The neutralized polymer film is transferred from the polymerization solution containing the monomer into a clean solution of 0.25 M $TBABF_4$ in sulfolane. The polymer is then held at a potential corresponding to the p-doping scan limit until the current decreased to less than 10 $\mu A\ cm^{-2}$. The film is then neutralized by scanning from the conditioning potential to 0.0V. The potential limits selected for this conditioning step are about 100 to about 250 mV beyond the current peak associated with the p-doping process. After the conditioning step according to the present invention, the color of the neutral polymer changed irreversibly from a transparent yellow to black.

Example 3

Preparation of an Electrolyte Gel.

An illustrative polymer gel can be prepared by heating in one container 5.13 wt % poly(acrylonitrile) as a gelling agent having a molecular weight of about 150,000 g/mol in a sulfolane solvent at 140–160° C. In another container can be added sulfolane solvent containing tetrabutylammonium tetrafluoroborate salt (Sachem electrometric grade prepared by dehydration at 130°0 C. under dynamic vacuum for 48 hours) at 140–160° C. The salt concentration can be calculated as to obtain a total of 1M of tetrabutylammonium tetrafluoroborate salt in the final mixture of the poly (acrylonitrile) in sulfolane solvent with the salt in sulfolane solution. After mixing the contents of the two containers together a clear viscous solution of the gel can be spread on glass plates and left to set for one day. An alternative procedure is to spread the hot gel between two glass plates and imbed glass fiber filter paper in the gel to impart better mechanical properties to the final gel film.

Example 4

Preparation of an All-polymer Battery.

An all-polymer battery incorporating poly(1,4-bis(2-thienyl)-2-fluorobenzene)(pTFP) as both the anode and the cathode, and the electrolyte of Example B(2) can be prepared as follows.

The polymeric electrodes for the all-polymer battery can be electrochemically deposited from a solution of 0.1 M of monomers to a total charge of 1.99–2.3 mg/cm$^2$ of 1,4-bis(2-thienyl)-2-fluorophenylene). As a result, each polymer can be deposited on a 1.25–1.4 $\mu$m thick graphite-coated TEFLON film (125 $\mu$m) or carbon loaded poly(ethylene)/gold plated stainless steel mesh composite which would result in thin and flexible electrodes each having a thickness and surface areas of about 2 mm and about 9 cm$^2$, respectively.

The neutralized polymer electrodes so prepared can then be electrochemically conditioned according to the method of the present invention. The neutralized polymer film is transferred from the polymerization solution containing the monomer into a clean solution of 0.25 M TBABF$_4$ in sulfolane. The polymer is then held at a potential corresponding to the p-doping scan limit until the current decreased to less than 10 $\mu$A cm$^{-2}$. The potential limits selected for this conditioning step are about 100 to about 250 mV beyond the current peak associated with the n-doping or p-doping process.

Electrochemical cells can then be assembled in the neutralized state by shifting the potential of the polymeric electrode films into a region such that the polymeric electrode films were undoped and storing the polymeric electrode films in sulfolane solvent.

Test Methods and Procedures

All experiments were performed in a glove box (oxygen and water levels <1 ppm), under a pure argon atmosphere at room temperature. Tetramethylene sulfphone (sulfolane, Avocado, 99%) was distilled twice over CaH2 under reduced pressure. γ-Butyrolactone (BL, Fluka, 99%) was distilled over CaH2 under reduced pressure. Triethyleneglycol dimethylether (triglyme, Fluka, 98%) was distilled under reduced pressure over sodium benzophenone. All solvents were stored over activated molecular sieves inside the glove box prior to use. Diethyl sulfone (DES, 99%) was recrylstallized from doubly distilled, deionized water, and dehydrated under vacuum at 100° C. Tetrabutylammonium tetrafluoroborate (TBABF$_4$, SACHEM) was dehyrated for 48 hours under vacuum from 40° C. to 125° C. Dehydration of the monomers was carried out under vacuum from 40° C. to 100° C. The water content of the electrolyte solutions (usually less than 20 ppm) was monitored periodically using a Mertohm Karl-Fischer 684 KF Coulometer. All electrochemical measurements were performed with a PAR 273A potentiostat. Potentials were measured versus a Ag+/Ag reference electrode fabricated by inserting a silver wire into a tube with a vycor tip containing a solution of 0.1 M AgClO$_4$+0.25 M TBABF$_4$ in propylene carbonate. The reference electrode was calibrated prior to each experiment with respect to the ferrocenium/ferrocene (Fc+/Fc) redox couple. All potentials are reported with respect to the Fc+/Fc redox couple. The potential of the Ag+/Ag reference electrode was about +0.4 V with respect to the Fc+/Fc couple and about +3.65 V with respect to the Li+/Li couple.

Electropolymerization Potential.

All electrochemical measurements were performed in a 3-compartment glass cell with a Luggin capillary for a reference electrode. A 2.63 cm$^2$ platinum disc was used as the working electrode and two Pt meshes (2cm$^2$ each) were used as counter electrodes. The monomers TFP and TF2P were electropolymerized from a solution of 0.1M monomer with 0.25 M TBABF$_4$ as supporting electrolyte in sulfolane. The monomers THB and TF4P were not sufficiently soluble in sulfolane and were electropolymerized from a solution of 0.05 M monomer with 0.25 M TBABF$_4$ in a mixture of sulfolane and γ-butyrolactone 1:1 (v/v) and 1:3 (v/v), respectively. The counter electrode compartments were filled with the same electrolyte but without the monomer. Prior to each experiment, a platinum disc substrate was cleaned in a propane flame and placed into the working electrode compartment close to the Luggin capillary of the reference electrode compartment. The electropolymerization potential was determined by increasing the potential applied to the working electrode by 10 mV steps and was defined as the lowest potential at which a progressive increase in the electrode current was observed after 20 to 100 seconds.

Electrochemical Measurements.

For all measurements, about 100 mC cm$^{-2}$ of each polymer was deposited The as-deposited polymer was neutralized by scanning the potential at 1 mV s$^{-1}$ from the Open Circuit Potential (OCP) to 0.0 V. The potential was held at 0.0 V for 5 minutes to ensure complete neutralization. The neutralized polymer film was then subjected to an electrochemical conditioning step. The neutralized polymer film is transferred from the polymerization solution containing the monomer into a clean solution of 0.25 M TBABF$_4$ in sulfolane (or a PC mixture of 2M of diethyl sulfone/sulfolane or triglyme/sulfolane). The polymer was then held at a potential corresponding to the p-doping scan limit until the current decreased to less than 10 $\mu$A cm$^{-2}$. Upon completion of the conditioning step, the electrode is neutralized by scanning the potential at 1 mV s$^{-1}$ from the conditioning potential to 0.0 V.

The selection of TBABF$_4$/sulfolane electrolyte was based on experiments with a variety of salt/solvent systems that were found to provide the highest electrochemical reversibility and charge capacity for the polymer films. The stability range for the TBABF$_4$/sulfolane electrolyte was approximately −2.4V to +0.5V vs Agt/Ag and was determined by voltammetry at a clean platinum wire.

All cyclic voltammograms were acquired at a scan rate of 10 mVs$^{-1}$. The voltammetry was limited to either oxidation/neutralization cycling (p-doping/neutralization) or reduction/neutralization cycling (n-doping/neutralization). The potential limits were selected to be about 100 to about 250 mV beyond the current peak associated with the n-doping or p-doping process. The optimum potential window was chosen to obtain a balance between the highest discharge efficiency and charge capacity. It was discovered that charge capacity and cycling efficiency values are very sensitive to the potential window selected. In general, an increase in the potential limits for doping resulted in an increase in the doping density and a corresponding decrease in the cycling efficiency.

The doping densities and charge capacities were determined from the charge under the respective neutralization waves for n-doping and p-doping and the mass of the polymer. The mass of the neutral polymer was determined in the following way. The as-deposited polymer was neutralized and subjected to the condition step described above. The polymer film was then neutralized by scanning the potential at 1 mV s$^{-1}$ from the conditioning potential to 0.0 V and was then rinsed in clean THF, dried under vacuum and weighed. The mass of the polymer film was then determined by subtracting the weight of the platinum substrate which was obtained after pyrolizing the polymer film in a propane flame.

The stability of the polymer films during doping was determined from the change in the neutralization charge over multiple cycles. The average percentage charge loss per cycle was calculated from the charge under the neutralization wave of the voltammogram for n-doping or p-doping. A typical voltammogram for a polymer that exhibits both n-doping and p-doping is shown in FIG. 2. FIGS. 6–8 and FIGS. 10–12 are voltammograms showing 1$^{st}$, 50$^{th}$ and 100$^{th}$ cycles for n-doping and p-doping for phenylene-thienyl based polymers manufactured according to the method of the present invention. Charge loss was determined from the following formula:

$$CL = \left(\frac{Q_1 - Q_n}{Q_1}\right)\frac{1}{n} \times 100(\%)$$

where $Q_1$ is the neutralization charge in the first cycle and $Q_n$ is the neutralization charge in the n$^{th}$ cycle. For all measurements, the polymers were cycled 100 times after polymerization and conditioning according to the method of the present invention.

Polymerization of Phenylene-thienyl Based Polymers.

The phenylene-thienyl monomers TFP and TF2P were successfully electropolymerized from 0.25 M TBABF$_4$ in sulfolane as a dark green-black film on the surface on the platinum electrode. After neutralization, the films became yellow-green in color. The as-deposited polymer films were slightly soluble in THF and PC.

The monomers THB and TF4P were only slightly soluble in sulfolane so polymer films were obtained from mixtures of 1:1 (v/v) and 1:3 (v/v) γ-butyrolactone/ sulfolane, respectively, with 0.25 M TBABF4. THB and TF4P were soluble in this mixture and the polymerized films had the lowest solubility allowing relatively efficient deposition on the platinum substrate. During electropolymerization of all four of the monomers, the solution in the working electrode compartment acquired an intense green color due to the partial solubility of doped oligomers.

A typical series of current-time curves for the electropolymerization of pTFP in sulfolane are shown in FIG. 5. For applied voltages lower than the polymerization potential the current was less than 10 μA cm$^{-2}$, similar to the value obtained in the absence of the monomer. Once the applied potential reached the polymerization potential, after an induction time of 20–100 seconds, the deposition current increased continuously. The increase in current with time is due to the increase in the surface area of the growing film. Generally, after several hundred seconds polymerization, the current attained a steady state value corresponding to steady state growth of the polymer film over a constant surface area. The electropolymerization potentials for the four examples of phenylene-thienyl monomers are given in Table 1.

From Table 1 it can be seen that the polymerization potential of the phenylene-thienyl monomers increases with an increase in the number of the fluorine atoms on the phenylene ring. The fluorine substituents on the benzene ring can influence the polymerization reaction either through electronic or steric effects. The polymerization potentials for many thiophenes substituted in the 3 position are linearly related to the Hammett constant for the substituent, illustrating that electronic effects are more important than steric effects in most cases. These results show that the polymerization proceeds through removal of a π electron from the thiophene ring and that electropolymerization occurs at higher energy with increasing electrophilic nature of the substituent. In previous work the inventors have shown that the electropoloymerization potential for a series of fluorophenylthiophenes is also linear with the integrated Hammett constants for the fluorine substituents. Since polymerization occurs through the coupling of the radical cations in the 2 position of the thiophene rings at either end of the monomer, the electronic effect of the fluorine substituents is expected to be dominant resulting in higher polymerization potentials with increasing number of fluorine substituents.

FIGS. 6, 7 and 8 show typical voltammograms for pTHB, pTFP, and pTF2P in 0.25 M TBABF$_4$ in sulfolane for first, 50th and 100th cycles of n-doping/neutralization and p-doping/neutralization. The scan rate of 10 mV s~' was determined to be slow enough so as to allow complete doping and neutralization of the polymers for the thickness of films used.

From these Figures it is seen that pTHB, pTFP, and pTF2P exhibit highly reversible p-doping over 100 p-doping/ neutralization cycles. The potentials corresponding to the p-doping current peak are summarized in Table 1. From Table 1 it can be seen that the polymerization potentials for the monomers are lower than the potential at the current peak associated with the p-doping process, implying that the as-deposited films are not fully polymerized. In order to ensure complete polymerization of oligomers and short chain length polymers in the film, the conditioning step was performed prior to electrochemical measurements. After the conditioning step according to the present invention, the color of the neutral polymer changed from a transparent yellow to black. For pTHB and pTF2P, along with the change in color, the films which were initially slightly soluble, became insoluble in sulfolane, PC and THF. The changes in the physical properties of the polymer during the conditioning step are consistent with an increase in the conjugation length of the polymer. Reactions with the solvent or the salt are not likely at this potential range. Increases in p-doping density during voltammetry have been reported for polyacetylene and for polythiophene-based polymers, and have been ascribed to activation of the polymer film. See Chiang, C. K.; Blubaugh, E. A.; Yap, W. T. Polymer 1984, 25, 1112; Kawai, T.; Iwasa, T.; Onada, M.; Sakamoto, T.; Yoshino, K. J. *Electrochem. Soc.* 1992, 139, 3404; Novak, P.; Muller, K.; Santhanam, K. S. V.; Haas, O. *Chem. Rev.* 1997, 97, 207; Arbizzani, C.; Mastragostino, M. *Electrochimica Acta* 1990, 35, 251; Corradinni, A.; Mastragostino, M. *Synth. Met.* 1987, 18, 625; and Grimshaw, J.; Perera, S. D. *J. Electroanal. Chem.* 1990, 278,287, the complete disclosure of which is herein fully incorporated by reference. Prior to this work, the effect had not been quantified to improved conducting polymer performance. Moreover, due to the poor charge/discharge cycling characteristics (i.e., reversibility) resultant from the inferior chemical and electrochemical stability of polyacetylene, the potential use of polyacetylene as an electrode in a conditioning process as described here was impractical.

Figure 9A:
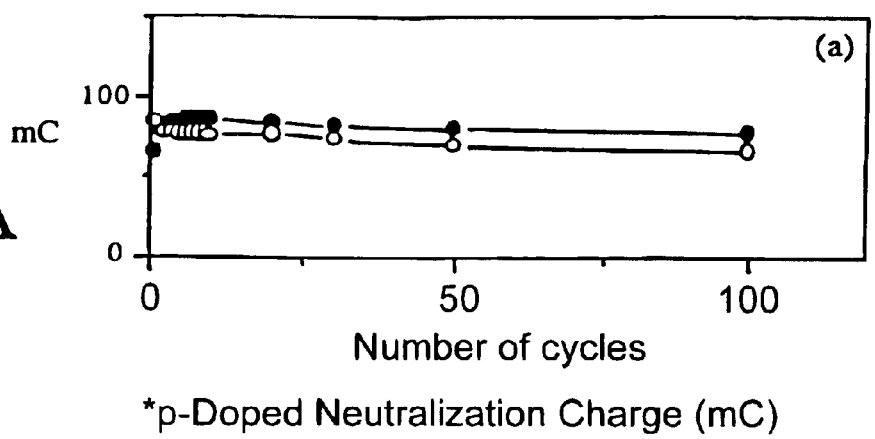
Figure 9B:
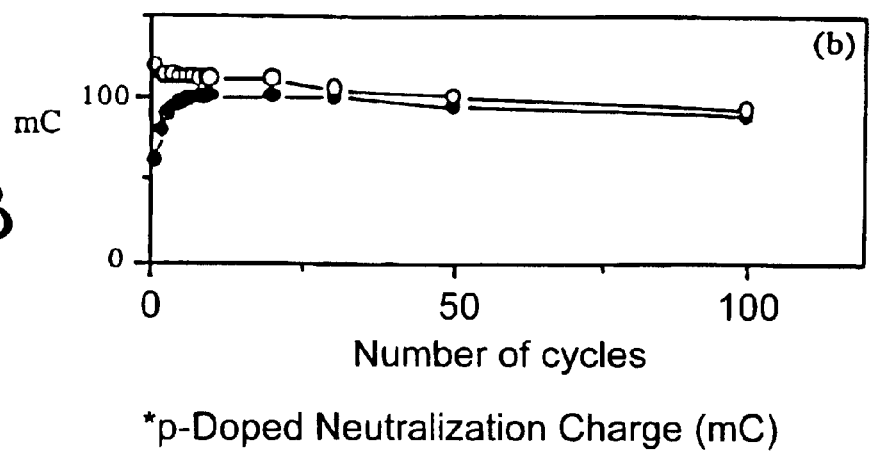
Figure 9C:
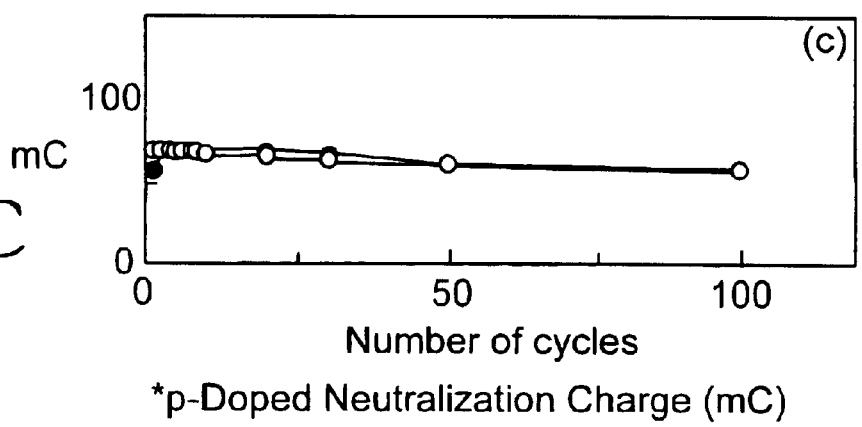

If this conditioning treatment was not performed, the charge under the p-doping neutralization wave obtained from voltammograms increased over the first 3–8 cycles. This result suggests that the further polymerization of oligomers in the film is a relatively slow in comparison to the doping process which is complete at the scan rate of 10 mV $s^{-1}$. FIG. 9A–C compares the p-doping neutralization charge for films with (open circles) and without (closed circles) the conditioning step as a function of number of cycles for pTHB, pTFP, and pTF2P. From this Figure it can be seen that the first cycle neutralization charge for conditioned films is close to the maximum value obtained for films that were not conditioned. Significantly, the final neutralization charges for cycle 100 are almost identical for the two processes.

The voltammograms for p-doping/neutralization of pTF4P in sulfolane, shown in FIG. 10A, are characterized by two peaks. From Table 1 it is seen that the potentials of the p-doping peaks for pTHB, pTFP, pTF2P increase from 0.98 to 1.13 V. In terms of electronic effects, the presence of additional fluorine groups on the benzene ring is expected to result in a shift of the p-doping peak to more positive potentials. The appearance of the first p-doping peak at 0.79 V for pTF4P suggests that steric effects may be important for this polymer. The inset of FIG. 10B shows the 1st, 50th, and 100th cycle for the first p-doping/neutralization peak.

The polymers pTHB, pTFP, and pTF2P exhibited reversible n-doping/neutralization over multiple cycles whereas pTF4P only exhibited n-doping over a few cycles. For all polymers, the charge associated with the first n-doping peak was found to be significantly larger than for subsequent cycles. The doping densities and cycling efficiencies were determined from the 2nd and 100th cycle.

The electrochemical properties of the four phenelenethienyl based polymers in sulfolane are summarized in Table 2. The p-doping densities were in the range of 0.32 to 0.52 electrons per monomer unit. For pTHB, p 1 PP, and pTF2P, the doping densities correspond to specific charge capacities in the range of 43–50 $mAhg^{-1}$. The average charge lost per cycle increased with the number of fluorine substituents with a minimum of 7.3% loss in capacity over 100 cycles pTHB under conditions where the polymer films were fully neutralized on each cycle. The decrease in cycling efficiency with increasing number of fluorines may be related to the increasingly positive potentials needed to access the p-doping process and hence the increased rate of solvent breakdown. The specific charge capacities are amongst the highest reported for any thiophene derivative and are significantly higher than the values previously obtained for a series of fluorophenyl thiophenes and reported by Y. Gofer, H., H. Sarker, J.g. Killian, T. O. Poehler, and P. C. Searson in *Journal of Electroanalytical Society* v.443, p.103 (1998), the complete text of which is herein fully incorporated by reference.

The n-doping densities for the polymers in sulfolane were smaller than for p-doping with a maximum of 0.28 electrons per monomer unit for pTFP, corresponding to a specific charge capacity of 27.9 $mAhg^{-1}$. The averaged charge loss per cycle decreased with increasing number of fluorines with a maxiumum loss of 35% over 100 cycles for pTHB and a minimum of 8.2% for pTF2P. The decrease in charge loss with number of fluorines is probably due to the stabilizaing effect of the fluorine groups for the excess negative charge associated with n-doping.

In order to improve the stability of the polymers and to obtain higher doping densities, sulfolane-based solvent mixtures were used as electrolytes. The results for the mixed solvent electrolytes are summarized in Tables 3 and 4 for diethyl sulfone/sulfolane and triglyme/sulfolane, respectively. It was observed that the solubility of the polymers, particularly for pTHB and pTF2P, increased in the solvent mixtures with consequent degradation of the polymer film during the cycling process. In general, there was no great improvement of the electrochemical properties of the polymers found in the solvent mixtures as compared with sulfolane alone. An interesting observation was that for the pTFP the n-doping and p-doping densities were nearly the same in the triglyme/sulfolane mixture, the specific charge capacity for n-doping was 35.5 $mAhg^{-1}$, higher than the value for p-doping of 31.6 $mAhg^{-1}$. Unfortunately, the average charge loss per cycle was low in both cases. FIGS. 11 and 12 show cyclic voltammograms for pTFP in 0.25M $TBABF_4$ in 2M diethyl sulfone/sulfolane (1:1 v/v) and in sulfolane/triglyme (1:1 v/v), respectively, showing the $1^{st}$, $50^{th}$ and $100^{th}$ cycles for (a) n-doping and (b) p-doping.

Table 5 summarizes the charge capacities and cycling efficiencies of pTPF (n-doping and p-doping) in different electrolyte solutions. Table 6 provides a summary of the charge capacities and cycling efficiencies of pTFP (n-doping and p-doping) in solutions of 0.25M $TBABF_4$ in different solvents.

From Table 1 it can be seen that the potential difference between the current peaks associated with n-doping and p-doping are about 3.2 V. These values are much higher than the values of about 2.4 V reported for the series of fluorophenyl thiophenes in the aforementioned Y. Gofer et al. report. This reflects the higher band gap of the neutral polymers in this series. These results suggest that open circuit potentials of about 3 V could be achieved on coupling fully n-doped and fully p-doped polymers in this series. Based on the electrochemical properties reported here, pTFP would appear to be the best candidate in this series of polymers for incorporation in an all-polymer battery.

TABLE 1

Polymerization potentials and the potentials corresponding to the current peaks for reduction (n-doping) and oxidation (p-doping) of phenylene-thienyl polymers in 0.25M $TBABF_4$ in A-sulfolane; B-sulfolane/2M diethyl sulfone, and C-sulfolane/triglyme (1:1 (v/v)).

| Poly-phenyl-ene-thienyl | Electro-Polymerization Potential of Monomer (V) | Reduction Peak Potential (n-doping) (V) | | | Oxidation Peak Potential (p-doping) (V) | | |
|---|---|---|---|---|---|---|---|
| | | A | B | C | A | B | C |
| pTHB | 0.65 | −2.24 | −2.25 | −2.34 | 0.98 | 1.04 | 1.08 |
| pTFP | 0.72 | −2.26 | −2.28 | −2.30 | 1.00 | 1.01 | 1.14 |
| pTF2P | 0.81 | −2.04 | −2.03 | −2.01 | 1.13 | 1.08 | 1.17 |
| pTF4P | 1.10 | irreversible | | | 0.79[a] 1.46[b] | | |

[a] limit for the first oxidation peak
[b] limit for the second oxidation peak

TABLE 2

Electrochemical characteristics for the phenylene-thienyl polymer series in 0.25M TBABF$_4$ in sulfolane.

| Poly Phenylene-thienyl | n-doping density (e/mu)[a] | p-doping density (e/mu)[a] | n-doping charge capacity (mAh g$^{-1}$) | p-doping charge capacity (mAh g$^{-1}$) | n-doping Average Charge lost Per cycle (%) | p-doping Average Charge lost Per cycle (%) | Anodic/Cathodic Scan limits (V) |
|---|---|---|---|---|---|---|---|
| pTHB | 0.17 | 0.42 | 18.59 | 46.73 | 0.35 | 0.07 | −2.41/+1.18 |
| pTFP | 0.28 | 0.42 | 27.90 | 43.21 | 0.25 | 0.14 | −2.40/+1.28 |
| pTF2P | 0.08 | 0.52 | 8.83 | 49.64 | 0.08 | 0.52 | −2.22/+1.35 |
| pTF4P | b | 0.03 |  | 2.77 |  | 0.48 | +0.92 |
| pTF4P | b | 0.32 |  | 27.56 |  | 0.40 | +1.65 |

[a] electrons per monomer unit
[b] irreversible

TABLE 3

Electrochemical characteristics for the phenylene-thienyl polymer series in 0.25M TBABF$_4$ in 2M diethyl sulfone/sulfolane.

| Poly Phenylene-thienyl | n-doping density (e/mu)[a] | p-doping density (e/mu)[a] | n-doping charge capacity (mAh g$^{-1}$) | p-doping charge capacity (mAh g$^{-1}$) | n-doping Average Charge lost Per cycle (%) | p-doping Average Charge lost Per cycle (%) | Anodic/Cathodic Scan limits (V) |
|---|---|---|---|---|---|---|---|
| pTHB | 0.11 | 0.39 | 11.40 | 43.19 | 0.17 | 0.09 | −2.36/+1.15 |
| pTFP | 0.25 | 0.43 | 26.71 | 44.51 | 0.39 | 0.18 | −2.40/+1.28 |
| pTF2P | 0.1 | 0.28 | 8.65 | 26.50 | 0.59 | 0.96 | −2.20/+1.30 |

[a] electrons per monomer unit

TABLE 4

Electrochemical characteristics for the phenylene-thienyl polymer series in 0.25M TBABF$_4$ in triglyme/sulfolane 1:1(v/v).

| Poly Phenylene-thienyl | n-doping density (e/mu)[a] | p-doping density (e/mu)[a] | n-doping charge capacity (mAh g$^{-1}$) | p-doping charge capacity (mAh g$^{-1}$) | n-doping Average Charge lost Per cycle (%) | p-doping Average Charge lost Per cycle (%) | Anodic/Cathodic Scan limits (V) |
|---|---|---|---|---|---|---|---|
| pTHB | 0.06 | 0.27 | 4.0 | 29.9 | 0.47 | 0.35 | −2.40/+1.20 |
| pTFP | 0.49 | 0.31 | 35.54 | 31.58 | 0.42 | 0.39 | −2.40/+1.25 |
| pTF2P | 0.02 | 0.25 | 1.84 | 24.47 | 0.31 | 0.35 | −2.20/+1.30 |

[a] electrons per monomer unit

TABLE 5

Charge capacities and cycling efficiencies of pTFP (n- and p-doping) in different PC electrolyte solutions

| SALT | | | N-DOPING | | | P-DOPING | | |
|---|---|---|---|---|---|---|---|---|
| Abbreviations | Cation | Anion | Charge Capacity * [mAhg$^{-1}$] | Cycling Efficiency [%] | Scan rate [mV$^{-1}$] | Charge Capacity * [mAhg$^{-1}$] | Cycling Efficiency [%] | Scan rate [mV$^{-1}$] |
| TMABF$_4$ | (CH$_3$)$_4$ | BF$_4$ | 30.20 | 99.46 | 1 |  |  |  |
|  |  |  | 19.26 | 99.95 | 25 | 18.84 | 99.93 | 25 |
| TEABF$_4$ | (C$_2$H$_5$)$_4$ | BF$_4$ | 29.62 | 99.51 | 1 | 25.87 | 99.76 | 1 |
|  |  |  | 29.68 | 99.26 | 25 | 26.89 | 99.98 | 25 |
| TPrABF$_4$ | (CH$_3$CH$_2$CH$_2$)$_4$ | BF$_4$ | 27.57 | 99.38 | 1 | 26.89 | 99.46 | 1 |
|  |  |  | 27.46 | 99.78 | 25 | 24.17 | low | 1 |
| TBABF$_4$ | [CH$_3$(CH$_2$)$_3$]$_4$ | BF$_4$ | 27.57 | 99.54 | 10 | 25.76 | 99.66 | 10 |
|  |  |  | 32.11 | 99.53 | 25 | 28.43 | 99.90 | 25 |
| THxABF$_4$ | [CH$_3$(CH$_2$)$_4$CH$_2$]$_4$ | BF$_4$ | 28.03 | 99.02 | 1 | 26.21 | 99.81 | 1 |
|  |  |  | 22.13 | 99.67 | 25 | 20.08 | 99.88 | 25 |
| THpABF$_4$ | [CH$_3$(CH$_2$)$_6$]$_4$ | BF$_4$ | 27.12 | 99.45 | 1 | 22.47 | Low | 1 |
|  |  |  | 28.83 | 99.63 | 25 | 19.86 | 99.51 | 25 |

TABLE 5-continued

Charge capacities and cycling efficiencies of pTFP (n- and p-doping) in different PC electrolyte solutions

| SALT | | | N-DOPING | | | P-DOPING | | |
|---|---|---|---|---|---|---|---|---|
| Abbreviations | Cation | Anion | Charge Capacity * [mAhg$^{-1}$] | Cycling Efficiency [%] | Scan rate [mV$^{-1}$] | Charge Capacity * [mAhg$^{-1}$] | Cycling Efficiency [%] | Scan rate [mV$^{-1}$] |
| BztEABF$_4$ | (C$_6$H$_5$CH$_2$N BF$_4$) (C$_2$H$_5$)$_3$ | BF$_4$ | 19.86 | <90.00 | 1 | 28.82 | 99.88 | 1 |
| K BF$_4$ | K | BF$_4$ | 12.14 | 99.39* | 0.5 | Electrolyte conductivity very low | | |
| TBAI | CH$_3$(CH$_2$)$_3$]$_4$ | I | 30.98 | 99.40 | 1 | Oxidation of Iodine | | |
| | | | 27.80 | 99.79 | 25 | | | |
| TBATPhB | [CH$_3$(CH$_2$)$_3$]$_4$ [CH$_3$(CH$_2$)$_3$]$_4$N | [B(C$_6$H$_5$)$_4$] | 30.41 | <90.00 | 1 | Noisy Very low cycling efficiency | | |
| | | | 18.38 | 99.94 | 25 | | | |
| TBACLO$_4$ | [CH$_3$(CH$_2$)$_3$]$_4$ | ClO$_4$ | 40.90 | 98.77 | 1 | 24.91 | 99.21 | 1 |
| | | | 30.88 | 99.74 | 25 | 20.56 | 99.89 | 25 |
| TBAPF$_6$ | [CH$_3$(CH$_2$)$_3$]$_4$ | PF$_6$ | 37.94 | 99.34 | 1 | 28.91 | 100.00 | 1 |
| | | | 28.59 | 99.79 | 25 | 18.42 | 99.96 | 25 |
| Li triflate | Li | CF$_3$SO$_3$ | 15.21 | 99.33 | 10 | 20.31 | 99.92 | 25 |
| TBA triflate | [CH$_3$(CH$_2$)$_3$]$_4$ | CF$_3$SO$_3$ | 25.08 | 99.25 | 25 | 22.63 | 99.93 | 25 |
| | | | 30.98 | 99.39 | 1 | 28.37 | 99.84 | 1 |
| K triflate | K | CF$_3$SO$_3$ | 16.34 | 99.29 | 25 | 21.11 | 100.00 | 25 |
| K AsF$_6$ | K | AsF$_6$ | Low charge capacity | | | 28.71 | 99.82 | 1 |
| LiASF$_6$ | Li | AsF$_6$ | Low charge capacity | | | 29.39 | 99.93 | 1 |

*First cycle; #40 cycles.

TABLE 6

Charge capacities and cycling efficiencies of pTFP (n- and p-doping) in different solvents with TBABF$_4$

| | N-DOPING | | | P-DOPING | | |
|---|---|---|---|---|---|---|
| SOLVENT | Charge capacity* [mAbg$^{-1}$] | Cycling Efficiency [%] | Scan Rate [mVs$^{-3}$] | Charge capacity* [mAbg$^{-1}$] | Cycling Efficiency [%] | Scan Rate [mVs$^{-1}$] |
| Propyonitrile | 31.77 | 99.56 | 10 | 15.89 | 98.57 | 10 |
| Benzonitrile | 25.98 | 99.13 | 10 | 19.40 | 99.47 | 10 |
| γ-Butyrolactone | 21.79 | 99.28 | 10 | 22.13 | 99.92 | 10 |
| 1,3-Dioxolane | 25.64 | 99.93 | 10 | Decomposition of solvent | | |
| 1-methyl 2-pyrrolidinone | 32.57 | 99.38 | 10 | Decomposition of solvent | | |
| Sulfolane | 28.37 | 100.00 | 10 | 24.62 | 99.98 | 10 |
| Sulfolane/2M of diethyl sulfone | 32.2 | 99.82 | 26.10 | | 99.98 | |
| Sulfolane/γ-butyrolactone | 40.48 | 98.58 | 22.50 | | 99.96 | |
| Dimethyl sulfoxide | 29.50 | 99.90 | 10 | Irreversible oxidation | | |
| Dimethyl carbonate | 19.63 | 99.98 | 10 | Low doping level (<4 mC) | | |
| Triglyme | 30.86 | 99.84 | 1 | 6.01 | <98.00 | 1 |

*First cycle.

Although the present invention has been described in detail with reference to its presently preferred embodiments, it will be understood by those of ordinary skill in the art that various modifications and improvements to the present invention are believed to be apparent to one skilled in the art. The embodiments were chosen and described in order to explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing an electrode comprising the steps of.
   (a) electropolymerizing monomers onto a substrate in a polymerization solution comprising at least one electrolyte salt and a first solvent to form an electrochemically oxidizable and reducible polymer;
   (b) electrochemically conditioning said polymer so as to increase discharge efficiency and charge capacity of said conditioned polymer;
   (c) doping said conditioned polymer for a period of time sufficient to impart a non-neutral charge to said conditioned polymer thus forming a charged electrode in a doped state, wherein said charged electrode exhibits charge capacities of 20 mAhg$^{-1}$ to 40 mAhg$^{-1}$ and a greater degree of reversibility in either the p-doped or n-doped state compared to an identical electrode that has not undergone steps (b) and (c).

2. The method according to claim 1, wherein said monomers are phenylene thienyl monomers.

3. The method according to claim 2, wherein said phenylene thienyl monomers are at least one of the members selected from the group consisting of 1,4-bis(2-thienyl)-benzene, 1,4-bis(2-thienyl)-2-fluorobenzene, 1,4-bis(2-thienyl)-2,5-difluoro-phenylene, and (1,4-bis(2-thienyl)-2,3,5,6-tetrafluorophenylene.

4. The method according to claim 3, wherein said phenylene thienyl monomers are 1,4-bis(2-thienyl)-2-fluorobenzene monomers.

5. The method according to claim 1, wherein said substrate is a member selected from the group consisting of platinum, palladium, gold, silver, titanium, copper, stainless steel, and combinations thereof.

6. The method according to claim 1, wherein said substrate is a member selected from the group consisting of carbon, graphite, conducting tin oxide and carbon-doped polyethylene.

7. The method according to claim 1, wherein said electrolyte salt is a member selected from the group consisting of tetrabutylammonium hexafluorophosphate, lithium tetrafluoroborate, tetraethylammonium tetrafluoroborate, tetrabutylammonium tetrafluoroborate, lithium perchlorate, tetrabutylammonium perchlorate, tetraethylammonium perchlorate, tetramethylammonium trifluoromethanesulfonate and tetrabultylammonium hexafluorophosphate.

8. The method according to claim 1, wherein said first electrolyte salt is tetrabutylammonium tetrafluoroborate.

9. The method according to claim 1, wherein said first solvent comprises a propylene carbonate based solvent or a sulfolane based solvent.

10. The method according to claim 1, wherein said first solvent comprises sulfolane.

11. The method according to claim 1, wherein said polymerization solution further comprises 0.25 M tetrabutylammonium tetrafluoroborate in sulfolane.

12. The method according to claim 1, wherein said electrochemically conditioning further comprises the steps of:
  (i) neutralizing said polymer;
  (ii) transferring said neutralized polymer from said polymerization solution into a fresh solution, not previously used in the polymerization process, but comprising said first electrolyte salt and said first solvent; and
  (iii) electrically charging said fresh solution by applying a current at a constant potential of 200 mV to 500 mV greater than the polymerization potential for said polymer until the current decreases to less than 10 $\mu$A cm$^{-2}$.

13. The method according to claim 12, wherein said first electrolyte salt and said first solvent are tetrabutylammonium tetrafluoroborate and sulfolane, respectively.

14. The method according to claim 12, wherein said potential for said electrochemical conditioning is between approximately 100 mV to 250 mV greater than the potential at which the charging current reaches a maximum during the oxidation (p-doping) or reduction (n-doping) of said polymer.

15. The method according to claim 1, wherein said doping further comprises:
  (i) placing a first electrode and a second electrode, both first and second electrodes being formed from said conditioned polymer, into an electrolyte solution, said electrolyte solution comprising a second electrolyte salt and a second solvent;
  (ii) applying a positive potential of a voltage source to said first electrode;
  (iii) applying a negative potential of said voltage source to said second electrode;
    wherein said first electrode and said second electrode after doping have a net positive charge and a net negative charge, respectively.

16. The method according to claim 15, wherein said second electrolyte salt and said second solvent are tetrabutylammonium tetrafluoroborate and sulfolane, respectively.

17. An electrode comprising at least one phenylene-thienyl based polymer, wherein the at least one phenylene-thienyl based polymer is produced according to the method of claim 1.

18. A method of conditioning an electronically conducting polymer comprising:
  (a) forming electrochemically oxidizable and reducible polymer in a polymerization solution, said polymer having a lower polymerization potential than p-doping peak;
  (b) neutralizing said polymer;
  (c) transferring said neutralized polymer from said polymerization solution into a new unused solution comprising an electrolyte salt and a solvent;
  (d) electrically charging said new unused solution at a potential close to the p-doping or n-doping scan limit of said polymer for a period of time or until the current decreases to less than 10 $\mu$Acm$^{-2}$ to form a conditioned electrically conducting polymer,
    wherein said electrode is able to undergo multiple doping and undoping cycles with an improved cycling efficiency compared to an unconditioned electrode.

19. A method of conditioning an electronically conducting polymer according to claim 18, wherein said electrode exhibits less than 1% charge loss per cycle over a period of 10 cycles for p-doping and less than 2% charge loss per cycle over a period of 5 cycles for n-doping.

20. A method for producing an electrochemical storage cell comprising:
  (a) forming a cathode electrode structure from an electronically conducting polymer, wherein the electronically conducting polymer comprises at least one phenylene-thienyl based polymer produced according to the method of claim 1;
  (b) forming an anode electrode structure;
  (c) formulating a polymer gel electrolyte comprising a polymer component, a salt, and an organic solvent or solvent mixture;
  (d) incorporating the polymer gel electrolyte between opposing surfaces of the cathode and anode electrode structures; and
  (e) combining the cathode electrode structure, anode electrode structure, and polymer gel electrolyte to produce the electrochemical storage cell.

21. The method according to claim 20, wherein said anode electrode structure is an electronically conducting polymer, wherein the electronically conducting polymer comprises at least one phenylene-thienyl based polymer produced according to the method of claim 1.

22. An electrochemical storage cell produced according to the method of claim 21.

23. A battery comprising at least one of the electrochemical storage cells of claim 22.

24. An electrochemical storage cell produced according to the method of claim 20.

* * * * *